US007640165B2

(12) United States Patent
Mukund

(10) Patent No.: US 7,640,165 B2
(45) Date of Patent: Dec. 29, 2009

(54) WEB BASED METHODS AND SYSTEMS FOR MANAGING COMPLIANCE ASSURANCE INFORMATION

(75) Inventor: R. Mukund, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 755 days.

(21) Appl. No.: 09/682,713

(22) Filed: Oct. 9, 2001

(65) Prior Publication Data

US 2003/0069983 A1 Apr. 10, 2003

(51) Int. Cl.
G06Q 99/00 (2006.01)
(52) U.S. Cl. .......................................................... 705/1
(58) Field of Classification Search ....................... 705/1
See application file for complete search history.

(56) References Cited

U.S. PATENT DOCUMENTS

| 3,249,769 | A | | 5/1966 | Mierendorf |
| 5,572,027 | A | | 11/1996 | Tawil et al. |
| 5,623,403 | A | * | 4/1997 | Highbloom ................. 705/28 |
| 5,924,074 | A | | 7/1999 | Evans |
| 6,064,977 | A | | 5/2000 | Haverstock et al. |
| 6,085,166 | A | | 7/2000 | Beckhardt et al. |
| 6,101,480 | A | | 8/2000 | Conmy et al. |
| 6,141,005 | A | | 10/2000 | Hetherington et al. |
| 6,141,754 | A | | 10/2000 | Choy |
| 6,163,732 | A | * | 12/2000 | Petke et al. ................. 700/106 |
| 6,222,535 | B1 | | 4/2001 | Hurd, II |
| 6,912,502 | B1 | * | 6/2005 | Buddle et al. ................... 705/1 |
| 2002/0032584 | A1 | * | 3/2002 | Doctor et al. ................... 705/3 |
| 2002/0143595 | A1 | * | 10/2002 | Frank et al. ..................... 705/8 |
| 2002/0184068 | A1 | * | 12/2002 | Krishnan et al. ................ 705/8 |
| 2003/0055669 | A1 | * | 3/2003 | Ryan et al. ...................... 705/1 |
| 2003/0088368 | A1 | * | 5/2003 | Inami et al. .................... 702/22 |
| 2003/0113697 | A1 | * | 6/2003 | Plescia ......................... 434/322 |
| 2004/0059510 | A1 | * | 3/2004 | Thompson et al. .............. 702/6 |

FOREIGN PATENT DOCUMENTS

JP 2001250023 A * 9/2001

OTHER PUBLICATIONS

Rash, Wayne Jr, "Choices in health and safety software," Occupational Health and Safety, v64n10, pp. 68-98, Oct. 1995.*

* cited by examiner

Primary Examiner—Jonathan Ouellette
(74) Attorney, Agent, or Firm—Armstrong Teasdale LLP

(57) ABSTRACT

A method for managing, storing, and disseminating compliance assurance (CA) information using a web-based system is provided. The system employs a server system coupled to a centralized interactive database and at least one client system. The method includes receiving CA information from a client system, storing CA information into a centralized database, cross-referencing CA information, updating the centralized database periodically to maintain CA information, providing CA information in response to an inquiry; and notifying users electronically of CA tasks and CA deadlines.

39 Claims, 24 Drawing Sheets

FIG. 6

ADDRESS

THIS IS A SAMPLE COMPLIANCE CENTER EMAIL!
TO: BUSINESS ADMINISTRATOR
WHEN: MONTHLY

COMPLIANCE CALENDAR

MONTHLY TASK COMPLIANCE SUMMARY REPORT
THURSDAY MAR-08-01 o THIS EMAIL IS AUTO-GENERATED FROM THE TEST COMPLIANCE CALENDAR ON THE
  WEB. PLEASE DO NOT RESPOND TO THE SENDING MAILBOX.

| GE POWERSUITE | | | | | | |
|---|---|---|---|---|---|---|
| | ACTIVE TASKS | YTD 2001 | | | TOTAL PAST DUE | |
| SITE | | COMPLETE | TOTAL | % COMPLETE | THIS FEBRUARY '01 | ADMIN | MGR |
| SUB-ORG: NORTH | | | | | | |
| TAMPA | 6 | 7 | 13 | 54% | 26 (23) | | |
| CINCINNATI | 5 | 10 | 20 | 50% | 30 (25) | | |
| SUB-ORG: SOUTH | | | | | | |
| GREENVILLE | 4 | 4 | 5 | 80% | 27 (19) | | |
| SCHENECTADY | 3 | 5 | 5 | 100% | 5 (2) | | | o NUMBERS SHOWN IN PARENTHESES ABOVE ARE THE NUMBER OF REGULATORY TASKS
  INCLUDED IN THE TOTAL.

FIG. 9

ADDRESS

THIS IS A SAMPLE COMPLIANCE CENTER EMAIL!
TO: SITE ADMINISTRATOR
CC: OPS MANAGER
WHEN: MONTHLY

COMPLIANCE CALENDAR

CLICK FOR YOUR COMPLIANCE CALENDAR HOMEPAGE

MONTHLY TASK COMPLIANCE STATUS REPORT
DEMONSTRATION SITE
THURSDAY MAR-08-01

- THIS EMAIL IS AUTO-GENERATED FROM THE TEST COMPLIANCE CALENDAR ON THE WEB. PLEASE NOT RESPOND TO THE SENDING MAILBOX.
- YOU HAVE RECEIVED THIS MESSAGE BECAUSE YOU ARE A RESPONSIBLE PERSON FOR ONE OR MORE OPEN PAST DUE COMPLIANCE CALENDAR TASKS WHOSE CLOSER MUST BE DOCUMENTED.
- IF A TASK CAN NO LONGER BE COMPLETED, A CORRECTIVE ACTION PLAN SHOULD BE USED TO MARK ITS CLOSURE ON THE CALENDAR (AND TO TERMINATE REMINDERS).
- PLEASE USE THE WEBLINK ABOVE TO VIEW THE COMPLIANCE CALENDAR. CONTACT JOHN SMITH IF YOU HAVE ANY QUESTIONS OR NEED HELP.

| RESPONSIBLE PERSON | FEBRUARY '01 | | | YTD 2001 | | | TOTAL PAST DUE THRU FEBRUARY '01 |
|---|---|---|---|---|---|---|---|
| | COMPLETED | TOTAL | % COMPLETE | COMPLETED | TOTAL | % COMPLETED | |
| | 1 | 1 | 100% | 1 | 1 | 100% | 0 |
| | 1 | 2 | 50% | 6 | 12 | 50% | 8 (8) |
| DEMONSTRATION SITE | 2 | 3 | 67% | 7 | 13 | 54% | 26 (23) |

- NUMBERS SHOWN IN PARENTHESES ABOVE ARE THE NUMBER OF REGULATORY TASKS INCLUDED IN THE TOTAL

CHRONOLOGICAL LIST OF PAST DUE TASKS THROUGH FEBRUARY '01

| DATE | TASK | RESPONSIBLE PERSON |
|---|---|---|

ADDRESS: [ ]

THIS IS A SAMPLE COMPLIANCE CENTER EMAIL!
TO: SITE ADMINISTRATOR
CC: SITE MANAGER, OPS MANAGER AND RESPONSIBLE PERSONS WITH OPEN AUDIT FINDINGS
WHEN: BI-WEEKLY (BY DEFAULT)

[AUDIT TRACKING SYSTEM]

CLICK FOR YOUR AUDIT TRACKING SYSTEM HOMEPAGE

BI-WEEKLY AUDIT FINDINGS STATUS REPORT
DEMONSTRATION SITE
THURSDAY MAR-08-01

REGULATORY FINDINGS 60-DAY AUDIT CLOSURE RATE
o CURRENT (03/08/01) AUDIT CLOSURE RATE: 30%
o PROJECTED MAXIMUM CLOSURE RATE @ THE END OF THE CURRENT QUARTER: 30%
  (ASSUMING ALL CURRENTLY OPEN ITEMS ARE CLOSED WITHIN 60 DAYS)
o PROJECTED MINIMUM CLOSURE RATE @ THE END OF THE CURRENT QUARTER: 30%
  (ASSUMING NO CURRENTLY OPEN ITEMS ARE CLOSED WITHIN 60 DAYS)
o NUMBERS SHOWN IN PARENTHESES BELOW (IF SHOWN) ARE THE NUMBERS OF INDIVIDUAL
  ITEMS WHEN DIFFERENT FROM THE NUMBER OF FINDINGS (i.e., FINDINGS WITH
  MULTIPLE AUDIT FINDING ITEMS CONTAINED WITHIN)

| OPEN AUDIT FINDINGS (NO. OF ITEMS) | REGULATORY | BMP/OTHER | TOTAL |
|---|---|---|---|
| OPEN FINDINGS | 15 (18) | 8 | 23 (26) |
| OPEN PAST DUE FINDINGS* | 13 (16) | 8 | 21 (24) |

* OPEN PAST DUE = OPEN PAST THE INDIVIDUAL CLOSURE DUE DATE FOR EACH FINDING

OPEN REGULATORY AUDIT FINDINGS (NO. OF ITEMS)
CRITICAL TO CLOSE WITHIN 60 DAYS
BY RESPONSIBLE PERSON

FIG. 14

ADDRESS:

THIS IS A SAMPLE COMPLIANCE CENTER EMAIL!
TO: BUSINESS ADMINISTRATOR
CC: ORG ADMINISTRATOR(S)
WHEN: BI-WEEKLY (BY DEFAULT)

BI-WEEKLY AUDIT FINDINGS SUMMARY REPORT
THURSDAY MAR-08-01

- THIS E-MAIL IS AUTO-GENERATED FROM THE TEST COMPLIANCE CENTER ON THE WEB. PLEASE DO NOT RESPOND TO THE SENDING MAILBOX.
- SUMMARY TOTALS SHOWN BELOW REFLECT NUMBERS OF TOTAL OPEN REGULATORY FINDINGS IN EACH AGE CATEGORY.
- NUMBERS SHOWN IN PARATHENSES BELOW (IF SHOWN) ARE THE NUMBER OF INDIVIDUAL ITEMS WHEN DIFFERENT FROM THE NUMBER OF FINDINGS (i.e., FINDINGS WITH MULTIPLE AUDIT FINDING ITEMS CONTAINED WITHIN)

| DAYS OLD | | | | | AUDIT CLOSURE RATE * | | | SITE | ADMIN | MGR | MGR | LAST FINDING DATE |
|---|---|---|---|---|---|---|---|---|---|---|---|---|
| 0-10 | 11-30 | 31-60 | 60+ | 330+ | CUR | MAX QTR | MIN QTR | | | | | |
| SUB-ORG: NORTH | | | | | | | | | | | | |
| 3 | 6 | 2 (93) | 1 (3) | 0% | 0% | 0% | ATLANTA | | | | | 09/17/00 |
| 2 | 7 | 2 | 13(16) | 0 | 30% | 30% | 30% | CINCINNATI | JOHN SMITH | JOHN SMITH | | 03/08/01 |
| SUB-ORG: SOUTH | | | | | | | | | | | | |
| 5 | 3 | 2 | 6 | 0 | 40% | 30% | 60% | GREENVILLE | | | | 02/18/01 |
| 2 | 4 | 3 | 0 | 0 | 60% | 95% | 70% | SCHENECTADY | | | | 03/01/01 |

*CUR=CURRENT 60 DAY AUDIT CLOSURE RATE BASED ON LAST 4 QUARTERS.
MAX QTR=PROJECTED MAXIMUM AUDIT CLOSURE RATE AT END OF THIS QUARTER, ASSUMING ALL CURRENTLY OPEN ITEMS ARE CLOSED WITHIN 60 DAYS.
MIN QTR=PROJECTED MINIMUM AUDIT CLOSURE RATE AT END OF THIS QUARTER, ASSUMING NO CURRENTLY OPEN ITEMS ARE CLOSED WITHIN 60 DAYS.

ADDRESS: [              ]

CLICK TO RETURN TO THE POWER HOMEPAGE WITHOUT SAVING THIS CHECKLIST
BLOODBORNE PATHOGENS CHECKLIST
MASTER (SCREENED)

(CLICK LINKS BELOW FOR WINDOWS CE VERSIONS OF THIS CHECKLIST)

INSTRUCTIONS
○ ANSWER EACH QUESTION IN THIS CHECKLIST BY COMPLETELY REVIEWING ALL ITEMS IN EACH QUESTION OR ITS GUIDE NOTE (IF PROVIDED). USE THE UPDATE AND SAVE BUTTON TO SAVE YOUR PARTIALLY OR FULLY ANSWERED CHECKLIST TO THE WEBSITE WITH YOUR OWN SECURE PASSWORD. CLICK HERE FOR THE DETAILED ONLINE HELP TUTORIAL GUIDE.
○ USE THE MAKE REPORT BUTTON FOR A PRINTABLE, ONLINE SUMMARY REPORT OF THE CHECKLIST; AND THE PRINT CHECKLIST BUTTON TO CREATE AN INTEGRATED CHECKLIST CONTAINING AUDIT GUIDANCE TO FACILITATE A FIELD AUDIT.
○ REVIEW THE APPLICABILITY AND INTRODUCTION PRIOR TO INITIATING THIS AUDIT CHECKLIST (SEE HYPERLINK BELOW).
○ NOTE: THE CHECKLIST ANSWER TEXT AREA IS LIMITED TO 4000 CHARACTERS. IF YOU TYPE MORE THAN THAT, IT WILL BE TRUNCATED ON SUBMISSION OF THE CHECKLIST.

[UPDATE AND SAVE]   [MAKE REPORT]   [PRINT CHECKLIST]**

ORGANIZATION: [        ]        SITE: [        ]
LOCATION DETAIL: [        ]     AUDIT DATE(S): [        ]
AUDITOR(S) &
GENERAL COMMENTS: [        ]

APPLICABILITY AND RESOURCES
INTRODUCTION | RULEBOOK & AUDIT GUIDANCE | ENFLEX REGULATIONS

RULEBOOK APPLICABLE WHEN:
THIS MODULE APPLIES TO OCCUPATIONAL EXPOSURE TO HUMAN BLOOD OR OTHER POTENTIALLY INFECTIOUS MATERIALS (OPIM). REGULATION 29 CFR 1910.1030 SPELLS OUT REQUIREMENTS THAT ARE DESIGNED TO PROTECT THE HEALTH OF NEARLY ALL EMPLOYEES AND CONTAINS PROCEDURES THAT CERTAIN EMPLOYERS MUST IMPLEMENT TO PROTECT EMPLOYEES FROM BLOODBORNE PATHOGENS. BLOODBORNE PATHOGENS REQUIREMENTS ALSO APPLY TO LONGSHORING OPERATIONS COVERED IN 29 CFR 1918 AND TO MARINE TERMINAL OPERATIONS COVERED IN 29 CFR 1917.

ADDRESS: [                    ]

BLOODBORNE PATHOGENS
SAVED AUDIT CHECKLIST SUMMARY

HOME PAGE | ON-LINE HELP | COMPLIANCE CENTER

AUDIT: DEMONSTRATION: 2/6/01 (CLICK TO RESUME SAVED CHECKLIST) — 950
AUDIT TEAM: RMUKUND
FINDINGS LAST UPDATE: MARCH 23, 2001: 05: 19PM
CHECKLIST PASSWORD: EXAMPLE

NOT APPLICABLE  0.0
COMPLIANT       0.0
NON-COMPLIANT   1.0
UNDER EVALUATION 17.0

0.0   5.0   10.0   15.0

SAVED AUDIT CHECKLIST STATUS SUMMARY:

| AUDIT QUESTIONS | NOT APPLICABLE | COMPLIANT | NON-COMPLIANT | UNDER EVALUATION |
|---|---|---|---|---|
| 18 | 0 | 0 | 1<br>1 NON COMPLIANCE ITEMS<br>∗EXPORT TO AUDIT TRACKING SYSTEM<br>◇EXPORT TO EXCELL<br>EXPORT RECORD: 2/6/01: 1.1: 3/23/01<br>(xls): 1.1: 3/23/01 (XTS): 1.1: 5/28/01<br>(xls): 1.1 | 17<br>0 IN PROGRESS<br>17 NOT ANSWERRED |

○ PRINT THIS PAGE OR NOTE THE PASSWORD USED TO SECURE THIS SAVED AUDIT CHECKLIST.
○ TO RESUME WORK, USE THE AUDIT HYPERLINK ABOVE OR THE RESUME PREVIOUSLY SAVED AUDIT CHECKLIST LINK FROM THE HOMEPAGE.
○ CLICK HERE IF YOU WISH TO CHANGE THE CHECKLIST PASSWORD.
○ CLICK TO DELETE THIS SAVED CHECKLIST FROM THE POWER DATABASE.
○ EXCEL DOWNLOAD ALL CHECKLIST QUESTIONS & ANSWERS

CONTACT SIGN UP

PLEASE INPUT YOUR CONTACT INFORMATION AND CLICK THE ADD NEW CONTACT BUTTON AT THE BOTTOM OF THIS FORM. YOU WILL BE IMMEDIATELY ADDED TO THE CONTACTS DATABASE. A COPY OF YOUR SUBMISSION WILL BE PROVIDED TO THE CONTACTS ADMINISTRATOR.

FULL NAME: [FORMAT: FIRST AND LAST NAME (e.g., JOHN Q. PERSON)]

TITLE:

FIRST NAME: | LAST NAME:
DIALCOMM PHONE: 8* | EXTERNAL PHONE:
ORGANIZATION: [SELECT 'NOT LISTED ABOVE' IF NOT IN LIST!] | FAX:
 | CELL PHONE/PAGER:
LOCATION: [SELECT 'NOT LISTED ABOVE' IF NOT IN LIST!] | HOME PHONE: (OPTIONAL)
BUILDING: (OPTIONAL) | INTERNET EMAIL ADDRESS: e.g., MY.NAME@MY.COMPANY.COM
ADDRESS: | EXPERTISE/ RESPONSIBILITY: (OPTIONAL)

[ADD NEW CONTACT] [CANCEL]

GET GAL INFO — CHECK THE GLOBAL ADDRESS LIST & COPY EMAIL ADDRESS INFO!

FIG. 21

Compliance Center Core Tables

*Please note the following:*
*Fields in italics denote primary key fields.*
*(i) refers to the corresponding Table number from the Org table*

The following tables are used by the Compliance Calendar and Audit Tracking System.

Table: Org(i)

| KEY FIELD | Description | Data Type | Field Size | Required | Populated from Table: Field Name |
|---|---|---|---|---|---|
| ORGNAME | Organization Name | Text | 50 | Yes | |
| TABLE | Org ID (also corresponds to table i where records are stored if specific to Org) | Number | Long Integer | Yes | |
| ORGPASSWORD | Password for Organization | Text | 50 | Yes | |
| BUSINESS | Rollup Business that this Org belongs to | Text | 50 | Yes | |
| ADMINISTRATOR | Organization Administrator | Text | 50 | Yes | |
| SUBORG | Suborgs (separate by commas, no spaces) | Text | 255 | No | |

Table: Site(i)

| KEY FIELD | Description | Data Type | Field Size | Required | Populated from Table: Field Name |
|---|---|---|---|---|---|
| LOCATION | Site Name | Text | 50 | Yes | |
| ADMIN | Administrator | Text | 50 | Yes | |
| PASSWORD | Password to site | Text | 50 | Yes | |
| SUBORG | Sub-Org for each Site (each Org may have multiple Sub-Orgs for clustering) | Text | 50 | No | |
| ATSCC_ON | Enable use of Compliance Calendar and Audit Tracking System webtools | Yes/No | Yes/No | Yes | |
| PROJECT | Is this a Project Calendar task? | Yes/No | Yes/No | Yes | |
| SUBSITE | Are there SubSites for this location? | Yes/No | Yes/No | Yes | |

Table: tbContact

| KEY FIELD | Description | Data Type | Field Size | Required | Populated from Table: Field Name |
|---|---|---|---|---|---|
| CONTACT_NAME | Full name of Contact Person | Text | 150 | Yes | |
| CONTACT_LASTNAME | Contact Person Last Name | Text | 255 | Yes | |
| CONTACT_FIRSTNAME | Contact Person First Name | Text | 255 | No | |
| CONTACT_PHONE | Contact's Telephone Number | Text | 255 | No | |
| CONTACT_TITLE | Contact Title | Text | 255 | Yes | |
| EHS_DEDICATED | Is the Contact EHS dedicated? | Yes/No | Yes/No | Yes | |
| CONTACT_LOCATION | Physical location of Contact Person | Text | 255 | Yes | |
| CONTACT_ORG | Contact Org | Text | 255 | Yes | |
| CONTACT_EMAIL | Contact Email Address | Text | 255 | Yes | |

Table: tbSSCoE(i)

| KEY FIELD | Description | Data Type | Field Size | Required | Populated from Table: Field Name |
|---|---|---|---|---|---|
| LOCATION | Site Name | Text | 50 | Yes | tbSite(i): LOCATION |
| COE | COE Name in Location | Text | 50 | Yes | |
| SUBSITE | Sub-Site Name in Location | Text | 50 | No | |
| ARCHIVE | Is the COE archived? | Yes/No | Yes/No | Yes | |

Table: tbBuilding(i)

| KEY FIELD | Description | Data Type | Field Size | Required | Populated from Table: Field Name |
|---|---|---|---|---|---|
| LOCATION | Site Name | Text | 50 | Yes | tbSite(i): LOCATION |
| BUILDING | Building Name in Location | Text | 50 | Yes | |

FIGURE 22

Audit Tracking System Tables

*Please note the following:*
*Fields in italics denote primary key fields*
*(i) refers to the corresponding Table number from the Org table*

Table: tbAudit(i)

| FIELD | Description | Data Type | Field Size | Required | Populated from Table: Field Name |
|---|---|---|---|---|---|
| Location | Site location for audit finding | Text | 50 | Yes | Site LOCATION |
| ID | Finding ID number (unique per location) | Number | Long Integer | Yes | |
| AuditName | Audit name | Text | 50 | No | |
| AuditDate | Audit finding date | Date/Time | NA | Yes | |
| AuditType | Audit finding date | Text | 50 | Yes | |
| FindingType | Finding type (e.g., Regulatory, Major, Other) | Text | 50 | Yes | |
| Category | Finding category | Text | 255 | Yes | tbCategory CATEGORY |
| Citation | Finding citation | Text | 255 | No | |
| NumItems | Number of individual noncompliance items in this finding | Number | Integer | Yes | |
| RepeatItem | Is finding a repeat item? Yes/No | Yes/No | Yes/No | Yes | |
| ClassificationType | Priority ranking (e.g., 1 day, 30 days) | Text | 50 | No | tbClosure CLOSURE |
| COE | COE if applicable | Text | 50 | No | tbCOE(i) COE |
| Bldg | Bldg if applicable | Text | 50 | No | tbBuilding(i) BUILDING |
| Workstation | General location of finding | Text | 50 | No | |
| ResponPerson | Responsible person | Text | 50 | Yes | |
| Description | Description of finding | Memo | NA | Yes | |
| CorrectiveAction | Corrective action | Memo | NA | Yes | |
| ContactPerson | Contact Person | Text | 50 | No | tbContact CONTACT_NAME |
| ContactPhone | Contact person telephone number | Text | 50 | No | |
| CloseDate | Actual closed date | Date/Time | NA | Yes | |
| CloseComment | Comment on closure | Memo | NA | Yes | |
| ClosePerson | Person closing out finding | Text | 50 | Yes | |
| Status | Status of finding | Text | 255 | Yes | |
| ClosureDueDate | Closure due date | Date/Time | NA | Yes | |
| UpdateDate | Date last updated | Date/Time | NA | No | |
| UpdateUser | Updated by User | Text | 150 | No | |

TABLE: tbAuditType*

| FIELD | Description | Data Type | Field Size | Required | Populated from Table: Field Name |
|---|---|---|---|---|---|
| AuditName | Name of Audit Type | Text | 100 | Yes | |
| AuditGroup | Group that AuditName belongs to | Text | 50 | Yes | |

*Primary Key Field is an AutoNumber

TABLE: tbCategory*

| FIELD | Description | Data Type | Field Size | Required | Populated from Table: Field Name |
|---|---|---|---|---|---|
| Category | Name of Finding Category | Text | 200 | Yes | |
| SuperCategory | Group that Category belongs to | Text | 50 | Yes | |

TABLE: tbClosure*

| FIELD | Description | Data Type | Field Size | Required | Populated from Table: Field Name |
|---|---|---|---|---|---|
| Closure | Closure Category (e.g., 1 day, 30 days) | Text | 100 | Yes | |

*Primary Key Field is an AutoNumber

FIGURE 23

Compliance Calendar System Tables

*Please note the following*
*Fields in italics denote primary key fields.*
*(t) refers to the corresponding Table number from the Org table*

TABLE: TASK(t)

| FIELD | Description | Data Type | Field Size | Required | Populated from other table: Field Name |
|---|---|---|---|---|---|
| *LOCATION* | Site Name | Text | 50 | Yes | Site LOCATION |
| *TASK_NAME* | Descriptive Task Name | Text | 255 | Yes | |
| RESP_PERSON | Responsible Person for task | Text | 50 | Yes | tbContact CONTACT_NAME |
| RESP_CC | Person who is copied on emails regarding the task | Text | 50 | No | tbContact CONTACT_NAME |
| MULT_CC | Email addresses of persons to be copied on task | Memo | NA | No | |
| MEDIA | Task Category (e.g., Administration) | Text | 50 | Yes | tbCalendarMedia Media |
| REMIND | Whether reminder is to be sent (default=Yes) | Yes/No | NA | Yes | |
| FIRST_REM_DATE | Task Date for the task (if this task is recurring, this field is the first date) | Date/Time | NA | Yes | |
| REM_FREQ | Reminder frequency | Text | 50 | Yes | |
| REM_DAYS_PRIOR | Number of days prior for the first email reminder | Number | Double | Yes | |
| REG_COMP | Is the task a Regulatory/Priority Task? | Yes/No | NA | Yes | |
| TASK_PLAN | Description of Task | Memo | NA | No | |
| WEBLINK | Weblinks associated with Task (comma delimited) | Memo | NA | Yes | |
| COMP | Task Frequency Terminated | Memo | NA | Yes | |
| COMP_DATE | When is the termination date | Date/Time | NA | No | |
| PROJECT | Is this a Project Calendar Task? | Yes/No | NA | Yes | |
| UPDATE_DATE | Date the Task was last updated | Date/Time | NA | No | |

TABLE: tbCalendarMedia*

| FIELD | Description | Data Type | Field Size | Required | Populated from other table: Field Name |
|---|---|---|---|---|---|
| *MEDIA* | Type of tass (category) | Text | 50 | Yes | |

*Primary Key Field is an AutoNumber

TABLE: TASK_REMINDER

| FIELD | Description | Data Type | Field Size | Required | Populated from other table: Field Name |
|---|---|---|---|---|---|
| *LOCATION* | Location | Text | 50 | Yes | Site LOCATION |
| *TASK_NAME* | Task Description/Name | Text | 255 | Yes | |
| *REMINDER_DATE* | Reminder Due Date | Date/Time | NA | Yes | |
| RESP_PERSON | Responsible Person For This Reminder | Text | 50 | Yes | tbContact CONTACT_NAME |
| COMPLETE | Reminder Complete? Yes/No | Yes/No | NA | No | |
| COMPLETE_DATE | Completion Date and Time | Date/Time | NA | Yes | |
| COMMENT | Completion Comment | Memo | NA | No | |
| REMINDER_PLAN | Reminder Plan (Applies To Project Milestones) | Memo | NA | No | |

TABLE: TASK_REMINDER_ARCHIVE

| FIELD | Description | Data Type | Field Size | Required | Populated from other table: Field Name |
|---|---|---|---|---|---|
| *LOCATION* | Location | Text | 50 | Yes | Site LOCATION |
| *TASK_NAME* | Task Description/Name | Text | 255 | Yes | |
| *REMINDER_DATE* | Reminder Due Date | Date/Time | NA | Yes | |
| RESP_PERSON | Responsible Person For This Reminder | Text | 50 | Yes | tbContact CONTACT_NAME |
| COMPLETE | Reminder Complete? Yes/No | Yes/No | NA | No | |
| COMPLETE_DATE | Completion Date and Time | Date/Time | NA | Yes | |
| COMMENT | Completion Comment | Text | 255 | No | |
| REMINDER_PLAN | Reminder Plan (Applies To Project Milestones) | Memo | NA | No | |

TABLE: FREQUENCY

| FIELD | Description | Data Type | Field Size | Required | Populated from other table: Field Name |
|---|---|---|---|---|---|
| *TYPE* | Frequency Type (e.g., monthly, weekly) | Text | 50 | Yes | |

FIGURE 24

WEB BASED METHODS AND SYSTEMS FOR MANAGING COMPLIANCE ASSURANCE INFORMATION

BACKGROUND OF INVENTION

This invention relates generally to managing compliance assurance and, more particularly, to network-based methods and systems for managing compliance assurance information.

Compliance assurance (CA) information includes information relating to a business entity's compliance with applicable laws and regulations and/or internal business standards and policies. These laws and regulations and/or internal business standards and policies typically relate to areas such as the environment, health and safety, quality, legal, human resources, and corporate compliance. In at least some known cases, in order for a business entity to comply with applicable laws and regulations and/or internal business standards and policies, a particular facility within the business entity must perform certain CA tasks, including audits, within a specified period of time and submit a report or other documentation to an agency or a manager within the business entity. Many of these CA tasks must be performed on a routine basis at the facility.

Likewise, other facilities within the business entity might also have to perform and report identical, similar, or different CA tasks. In addition, if a facility is found to be in non-compliance, the facility might be required to take certain action to become compliant and might have to submit documentation showing its compliance. For business entities having numerous employees located in multiple divisions worldwide, managing CA information, which might include scheduling the CA tasks to be performed at each facility, reminding an assigned contact person at each facility of the upcoming CA tasks to be performed, confirming that the required CA tasks have been performed in a timely manner at each facility, properly documenting the CA tasks performed at each facility, and confirming that each facility within the business entity is in compliance with applicable laws and regulations and/or internal business standards and policies, is a major challenge. Failure to properly schedule, perform, and report the CA tasks, including audits, can result in delayed system operations, extended or additional maintenance, increased costs, and, in some cases, civil and/or criminal penalties.

SUMMARY OF INVENTION

In on aspect, a method for managing, storing, and disseminating compliance assurance (CA) information using a web-based system is provided. The system employs a server system coupled to a centralized interactive database and at least one client system. The method includes receiving CA information from a client system, storing CA information into a centralized database, cross-referencing CA information, updating the centralized database periodically to maintain CA information, providing CA information in response to an inquiry; and notifying users electronically of CA tasks and CA deadlines.

In another aspect, a method for managing, storing, and disseminating compliance assurance (CA) information using a web-based system is provided. The system employs a server system coupled to a centralized interactive database, at least one managerial user system, and at least one client system. The CA information includes at least one of site information, a CA calendar, a CA audit tracking system, a CA audit tool, and CA contacts information. The method includes the steps of receiving CA information from a client system, storing CA information into a centralized database, cross-referencing CA information, updating the centralized database periodically to maintain CA information, providing CA information in response to an inquiry, notifying users electronically of CA tasks and CA deadlines, and providing an electronic report of the CA audit tracking system and the CA calendar to the managerial user system.

In another aspect, a method for manipulating Compliance Assurance (CA) information using a web-based system is provided. The system employs a server system coupled to a centralized interactive database and at least one client system. The CA information includes at least one of business information, organizational information, site information, assigned contact person information, COE/department information, building information, CA audit tracking information, CA task information, CA calendar information, CA task reminder information, frequency of reminder information, environmental information, health and safety information, quality information, legal information, human resources information, management information, and corporate compliance information. The method includes receiving CA information, storing CA information into the centralized database, and cross-referencing CA information including creating a CA calendar based on at least one of CA tasks to be performed, a change in other previously created CA calendars, and a change in CA audit tracking information. The method further includes updating the centralized database with CA information including adding and deleting information so as to revise existing CA information including at least one of CA task information, CA calendar information, and CA audit tracking information. The method also includes providing CA information including at least one of business information, organizational information, site information, assigned contact person information, COE/department information, building information, CA audit tracking information, CA task information, CA calendar information, CA task reminder information, frequency of reminder information, environmental information, health and safety information, quality information, legal information, human resources information, management information, and corporate compliance information, in response to an inquiry, including downloading requested information from the server system and displaying requested information on the client system, the inquiry including utilizing at least one pull-down lists, check boxes, and hypertext links. Additionally, the method includes notifying users of CA tasks and CA deadlines including transmitting an electronic message to the client system from the server system notifying the user of a CA task to be performed.

In another aspect, a method for manipulating Compliance Assurance (CA) information using a web-based system is provided. The system employs a server system coupled to a centralized interactive database, at least one managerial user system, and at least one client system. The CA information includes at least one of business information, organizational information, site information, assigned contact person information, COE/department information, building information, CA audit tracking information, CA task information, CA calendar information, CA task reminder information, frequency of reminder information, environmental information, health and safety information, quality information, legal information, human resources information, management information, and corporate compliance information. The method includes receiving CA information, storing CA information into a centralized database, cross-referencing CA information including creating a CA calendar based on at least one of CA tasks to be performed, a change in other previously created CA calendars, and a change in CA audit tracking information. The method further includes updating the centralized database with CA information including adding and deleting information so as to revise existing CA information including at least one of CA task information, CA calendar information, and CA audit tracking information. The method also includes providing CA information including at least one of business information, organizational information, site information, assigned contact person information, COE/department information, building information, CA audit tracking information, CA task information, CA calendar information, CA task reminder information, frequency of reminder information, environmental information, health and safety information, quality information, legal information, human resources information, management information, and corporate compliance information, in response to an inquiry, including downloading requested information from the server system and displaying requested information on the client system, the inquiry including utilizing at least one pull-down lists, check boxes, and hypertext links. Additionally, the method includes notifying users of CA tasks and CA deadlines including transmitting an electronic message to the client system from the server system notifying the user of a CA task to be performed, and providing an electronic report to the managerial user system including transmitting an electronic report to the managerial user system from the server system including a summary of the CA tasks performed at a site location for a time period shown on the CA calendar such that managerial oversight of the CA information is facilitated and compliance with certain laws, rules, regulations, standards, and policies relating to certain topics including at least one of environment, health and safety, quality, legal, and corporate compliance is assured.

In another aspect, a network based system for managing, storing, and disseminating Compliance Assurance (CA) information is provided. The system includes a client system with a browser, a centralized database for storing information, and a server system configured to be coupled to said client system and said database. The server system is further configured to receive CA information from the client system, store CA information into the centralized database, cross-reference CA information, update the centralized database periodically to maintain CA information, provide CA information in response to an inquiry, and notify users electronically of CA tasks and CA deadlines.

In another aspect, a network based system for managing, storing, and disseminating Compliance Assurance (CA) information is provided. The CA information includes at least one of site information, a CA audit tracking system, a CA calendar, a CA audit tool, and contact information. The system includes a client system with a browser, a managerial user system with a browser, a centralized database for storing information, and a server system configured to be coupled to the client system, the managerial user system, and the database. The server system is further configured to receive CA information from the client system, store CA information into the centralized database, cross-reference CA information, update the centralized database periodically to maintain CA information, provide CA information in response to an inquiry, notify users electronically of CA tasks and CA deadlines, and provide an electronic report of the CA audit tracking system and the CA calendar to the managerial user system.

In another aspect, a computer program embodied on a computer readable medium for managing, storing, and disseminating Compliance Assurance (CA) information is provided. The program includes a code segment that receives CA information and then maintains a database by adding, deleting and updating CA information. The program also generates at least one CA calendar based on the received CA information, manages at least one CA audit tracking system based on the received CA information, and provides the CA calendar, the CA audit tracking system, a CA audit tool system, and contact information to users. The program also notifies users of CA tasks and CA deadlines, and provides a report of the CA audit tracking system and the CA calendar.

BRIEF DESCRIPTION OF DRAWINGS

FIG. 6 is an exemplary embodiment of a user interface of CACS displaying a Compliance Calendar.

FIG. 9 is an exemplary embodiment of a user interface of CACS displaying a monthly task compliance summary report.

FIG. 10 is an exemplary embodiment of a user interface of CACS displaying a monthly task compliance status report.

FIG. 12 is an exemplary embodiment of a user interface of CACS displaying an Add/Edit Task page for the Audit Tracking System.

FIG. 13 is an exemplary embodiment of a user interface of CACS displaying a Charts page for the Audit Tracking System.

FIG. 14 is an exemplary embodiment of a user interface of CACS displaying a bi-weekly audit findings status report.

FIG. 15 is an exemplary embodiment of a user interface of CACS displaying a bi-weekly audit findings summary report.

FIG. 16 is an exemplary embodiment of a user interface of CACS displaying an Audit Tool.

FIG. 17 is an exemplary embodiment of a user interface of CACS displaying a selected audit tool checklist.

FIG. 18 is an exemplary embodiment of a user interface of CACS displaying an audit checklist summary.

FIG. 21 is an exemplary embodiment of a user interface of CACS displaying a page for inputting a contact person's contact information.

FIG. 22 is a list of at least some of the data tables and key fields used by CACS.

FIG. 23 is another list of at least some of the data tables and key fields used by CACS.

FIG. 24 is another list of at least some of the data tables and key fields used by CACS.

DETAILED DESCRIPTION

Figure 1:
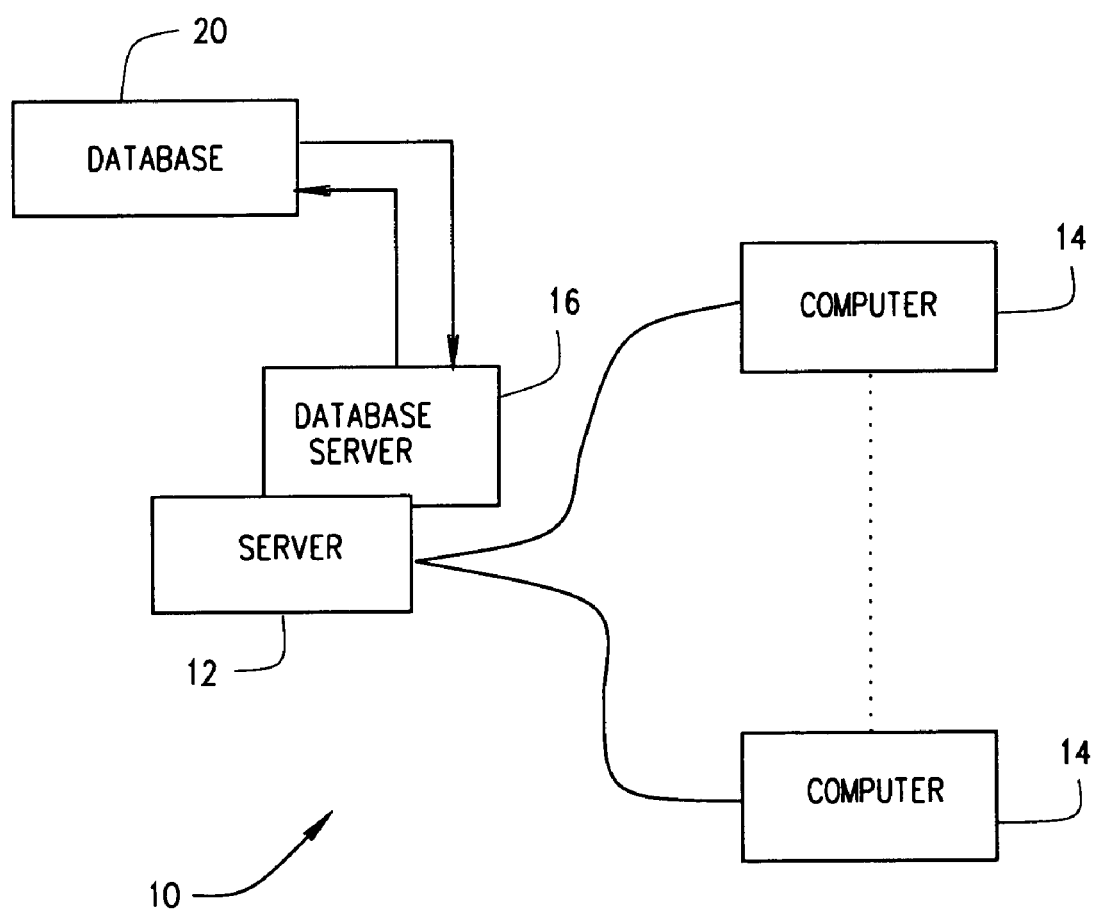
FIG. 1 is a simplified block diagram of a Compliance Assurance Coordination System (CACS) in accordance with one embodiment of the present invention.

Exemplary embodiments of systems and processes that facilitate integrated network-based electronic reporting and workflow process management related to a Compliance Assurance Coordination System (CACS) are described below in detail. The systems and processes facilitate, for example, electronic submission of information using a client system, automated extraction of information, and web-based reporting for internal and external system users. The CACS allows a business entity to conduct and manage its own internal assessments and audit tracking to assure its compliance with certain laws, rules, regulations, standards, and policies relating to certain topics including at least one of the environment, health and safety, quality, legal, and corporate compliance.

In the exemplary embodiment, the CACS collects, tracks, displays, schedules, and disseminates real time information regarding Compliance Assurance (CA) information for a site location within a business entity. CA information includes at least one of business information, organizational information, site information, assigned contact person information, COE/department information building information, CA audit tracking information, CA task information, CA calendar information, CA task reminder information, frequency of reminder information, CA contacts information, environmental information, health and safety information, quality information, legal information, human resources information, management information, and corporate compliance information. In addition, the CACS electronically notifies the users of upcoming CA tasks and CA deadlines, and provides a summary report to a managerial user, which describes at least the CA tasks performed at a site location during a specific period of time.

In addition, a network-based CACS collects, tracks, displays, schedules, and disseminates real time information regarding a CA calendar. The CA calendar shows the CA tasks to be performed at a selected site location within a business entity during a specified period of time. In another embodiment, the CACS collects, tracks, displays, schedules and disseminates information regarding a CA audit tracking system. The CA audit tracking system tracks the CA tasks performed at each site location, records the findings from the CA tasks, documents the findings for purposes of reporting to an agency or the business entity's management, assures compliance with the certain laws, rules, regulations, standards, and policies, and, if non-compliance is found, tracks the corrective actions taken at the site location. In another embodiment, the CACS includes both the CA calendar and the CA audit tracking system and further includes a CA audit tool system and CA contacts information. The CA audit tool system provides a plurality of audit checklists to help a user in conducting various audits at the site location. The CA contacts information provides information relating to persons associated with certain CA tasks and CA audits. The CA calendar, the CA audit tracking system, the CA audit tool system, and the CA contacts information in the CACS are used by multiple site locations within a business entity, namely each site location or facility subject to compliance with laws, rules, regulations, standards, and policies relating to at least one of environment, health and safety, quality, legal, and corporate compliance.

CA information relating to each site location within a business entity is received by the CACS which stores the CA information in a database, updates the database with CA information received, cross-references the CA information received, provides CA information in response to an inquiry, notifies a user electronically of CA tasks and CA deadlines, and provides a report to at least one managerial user of the CA tasks performed at specific site locations for a specified period of time.

In the CACS, CA information is stored in the database. The network based CACS provides convenient access to CA information, including original schedules, preliminary schedules and confirmed schedules. Once into the CACS home page, the user has an option to access the CA calendar, the CA audit tracking system, the CA audit tool, or the CA contacts homepage and access CA information for a specific site location. In an exemplary embodiment, for each site location, an authorized user can access the CA information.

In one embodiment, the system is a computer program embodied on a computer readable medium implemented utilizing a Structured Query Language (SQL) with a client user interface front-end for administration and a web interface for standard user input and reports. In an exemplary embodiment, the system is web enabled and is run on a business-entity's intranet. In yet another embodiment, the system is fully accessed by individuals having an authorized access outside the firewall of the business-entity through the Internet. In a further exemplary embodiment, the system is being run in a Windows NT environment. The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of a Compliance Assurance Coordination System (CACS) 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
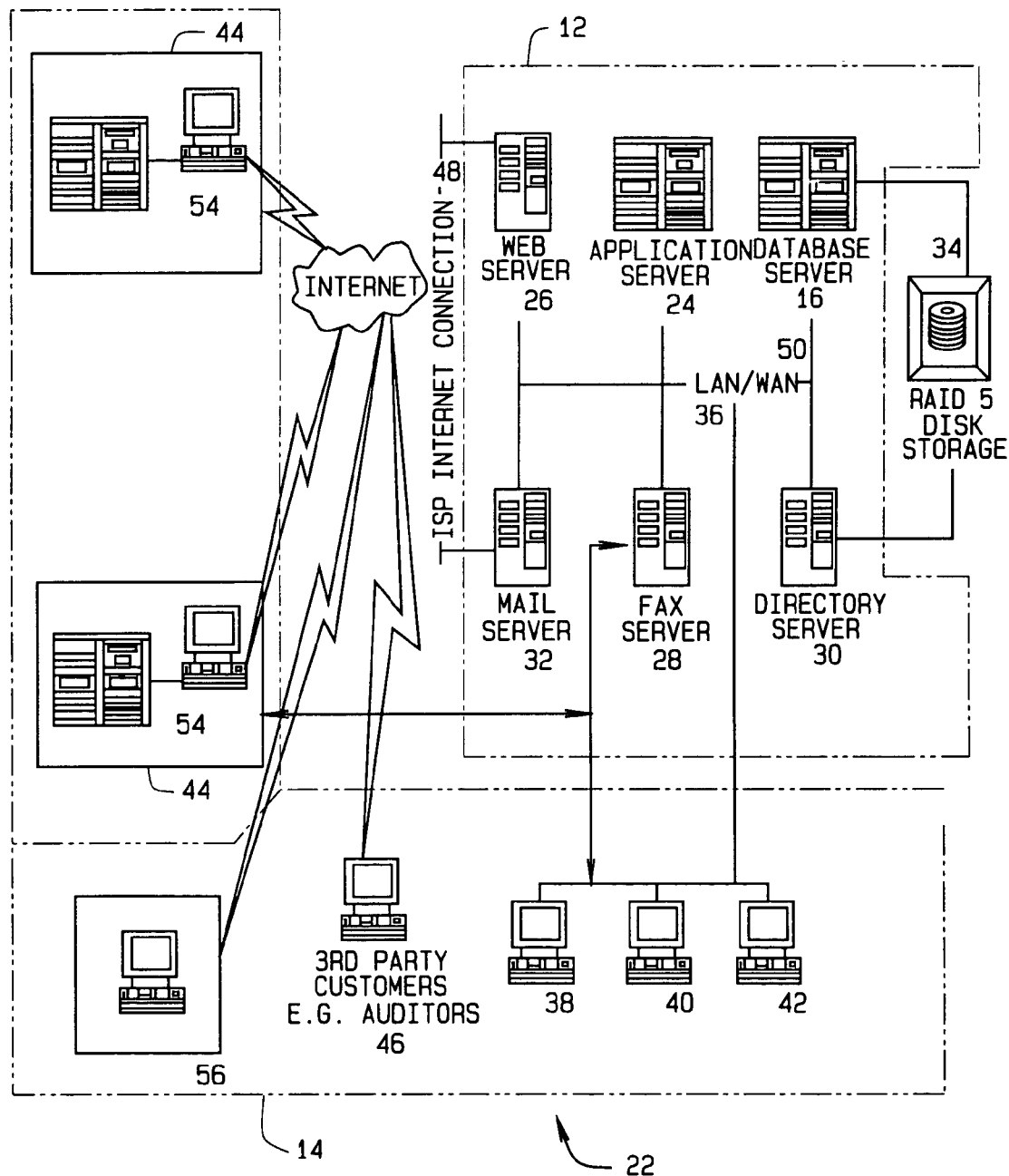
FIG. 2 is an expanded version block diagram of an exemplary embodiment of a server architecture of the CACS.

FIG. 2 is an expanded version block diagram of an exemplary embodiment of a server architecture of a CACS 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., internal or outside consultants, 46 via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50.

In the exemplary embodiment, any authorized individual having a workstation 54 can access CACS 22. At least one of the client systems includes a manager workstation 56 located at a remote location. Work stations 54 and 56 are personal computers having a web browser. Also, work stations 54 and 56 are configured to communicate with server system 12. Furthermore, fax server 28 communicates with remotely located client systems, including a client system 56 via a telephone link. Fax server 28 is configured to communicate with other client systems 38, 40, and 42 as well.

Figure 3:
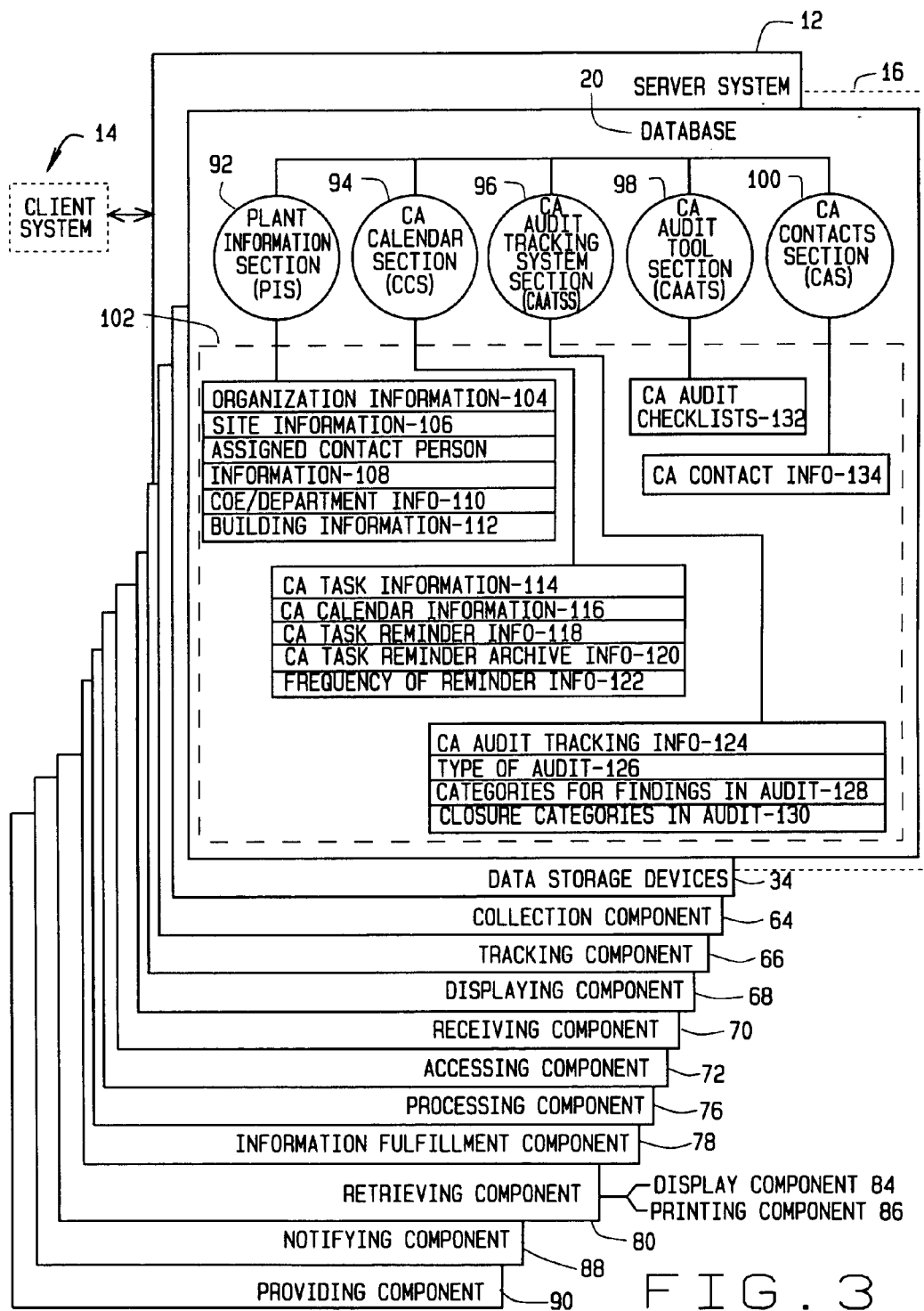
FIG. 3 shows a configuration of a database within the database server of the server system including other related server components.

FIG. 3 shows a configuration of database 20 within database server 16 of server system 12 shown in FIG. 1. Database 20 is coupled to several separate computer software components within server system 12, which perform specific tasks. Server system 12 includes a collection component 64 for collecting data from users in database 20, a tracking component 66 for tracking data, and a displaying component 68 to display information. Tracking component 66 tracks and cross-references data, including modifying existing data. Server system 12 also includes a receiving component 70 to receive a specific query from client system 14, and an accessing component 72 to access database 20 within data storage device 34. Receiving component 70 is programmed for receiving a query from one of a plurality of users. Server system 12 further includes a processing component 76 for searching and processing received queries against database 20 containing a variety of information collected by collection component 64. An information fulfillment component 78, located in server system 12, downloads the requested information to the plurality of users in response to the requests received by receiving component 70. Information fulfillment component 78 downloads the information after the information is retrieved from database 20 by a retrieving component 80. Retrieving component 80 retrieves, downloads and sends information to client system 14 based on a query received from client system 14.

Retrieving component 80 further includes a display component 84 configured to download information to be displayed on a client system's graphical user interface and a printing component 86 configured to print information. Retrieving component 80 generates reports requested by the user through client system 14 in a pre-determined format. System 10 is flexible to provide other alternative types of reports and is not constrained to the options set forth above.

Server system 12 also includes a notifying component 88 and a providing component 90. Notifying component 88 electronically transmits a message to client system 14 based on information inputted into server system 12 notifying a user of CA tasks to be performed and a CA schedule for performing those tasks. Providing component 90 electronically provides a report to manager workstation 56 (shown in FIG. 2) summarizing the CA tasks performed at a specific site location and the time period in which those CA tasks were performed.

In one embodiment, collection component 64, tracking component 66, displaying component 68, receiving component 70, processing component 76, information fulfillment component 78, retrieving component 80, display component 84, printing component 86, notifying component 88, and providing component 90 are computer programs embodied on computer readable medium.

Database 20 is divided into a Plant Information Section (PIS) 92, a CA Calendar Section (CCS) 94, a CA Audit Tracking System Section (CAATSS) 96, a CA Audit Tool Section (CAATS) 98, and a CA Contacts Section (CAS) 100. PIS 92 contains information specific to each plant within the business entity. PIS 92, CCS 94, CAATSS 96, CAATS 98, and CAS 100 facilitate database 20 storage of CA information 102.

PIS 90 includes CA information 102 for each site location or plant including, but not limited to, organizational information 104, site information 106, assigned contact person information 108, COE/department information 110, and building information 112.

CCS 94 contains CA information 102 relating to scheduling CA tasks. In one embodiment, CCS 94 includes at least one of CA task information 114, CA calendar information 116, CA task reminder information 118, CA task reminder archive information 120, and frequency of reminder information 122. Revisions or modifications to one stored CA calendar can effect other related CA calendars. Tracking component 66 also updates database 20 as it revises CA calendars.

CAATSS 96 contains CA information 102 relating to CA audits. In one embodiment, CAATSS 96 includes at least one of CA audit tracking information 124, type of audit 126, categories for findings in audit 128, and closure categories in audit 130. Revisions or modifications to CA audit tracking information 124 can effect CA calendar information 116. Tracking component 66 also updates database 20 as it revises CA audit tracking information 124.

CAATS 98 contains CA information 102 including a plurality of audit checklists 132. Audit checklists 132 might be used by a user performing a CA audit. CAS 100 contains CA information 102 including at least CA contact information.134. CA contact information 134 includes information relating to contact persons that might provide help in performing certain CA audits and CA tasks.

System 10 accumulates a variety of confidential data. Therefore, system 10 has different access levels to control and monitor the security of the system. Authorization for access is assigned by system administrators on a need to know basis. In one embodiment, system 10 provides access based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architectures of system 10 as well as various components of system 10 are exemplary only. Other architectures are possible and can be utilized in connection with practicing the processes described below.

Figure 4:
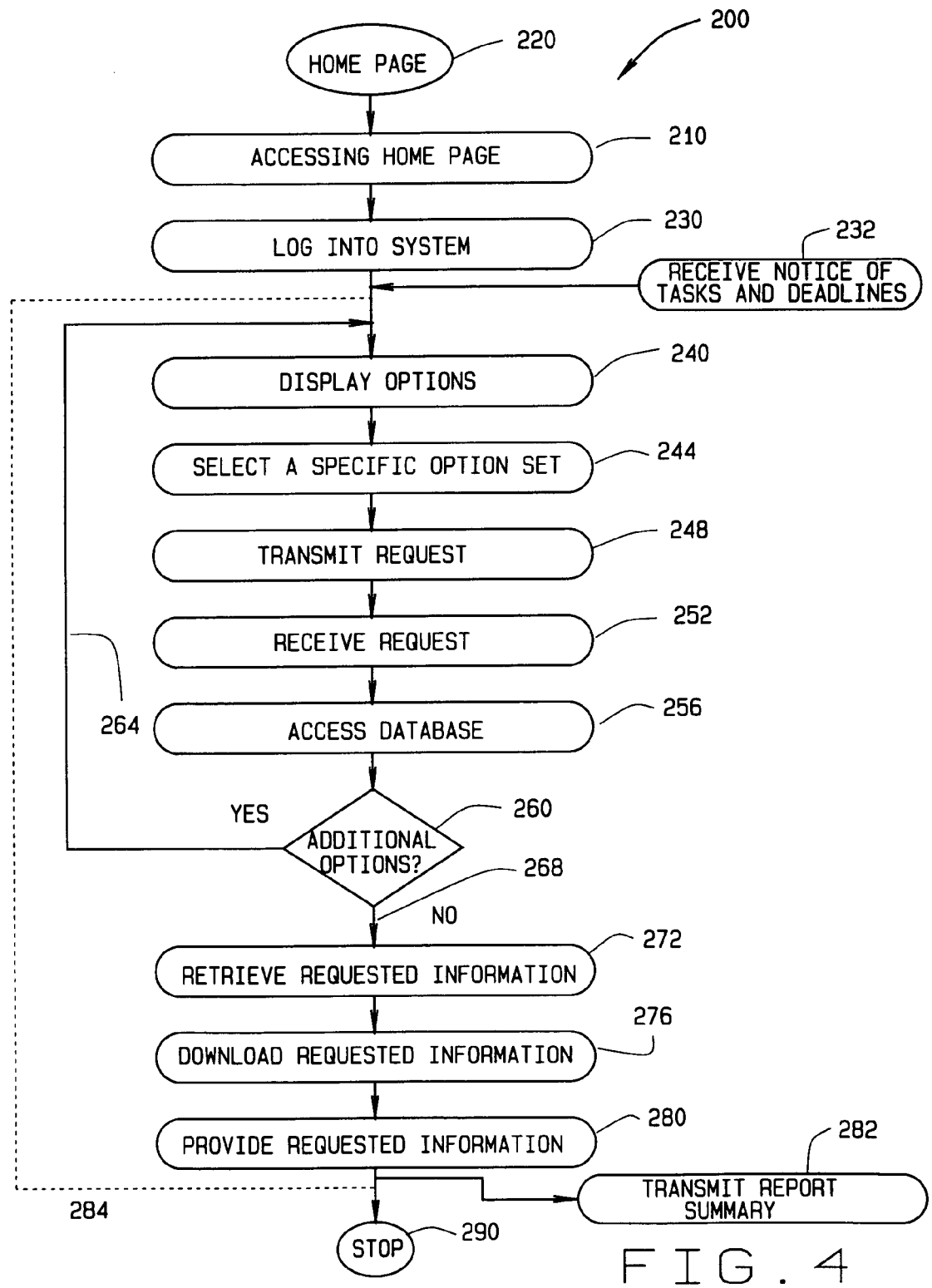
FIG. 4 is a flowchart of the processes employed by CACS to facilitate use.

FIG. 4 is a flowchart 200 of the processes employed by system 10 to facilitate use. Initially, the user accesses 210 a user interface such as a home page 220 of the web site through client system 14 (shown in FIG. 1). In one embodiment, client system 14, as well as server system 12, are protected from access by unauthorized individuals. The user logs-in 230 to system 10 using a password (not shown) or an employee payroll number for security. Client system 14 is configured to receive 232 an electronic notice of CA tasks and CA deadlines from server system 12. Client system 14 displays 240 options available to the user through links, check boxes, or pull-down lists. Once the user selects 244 an option (in one embodiment, relating to site location and CA task type) from the available links, the request is transmitted 248 to server system 12. Transmitting 248 the request is accomplished, in one embodiment, either by click of a mouse or by a voice command. Once server system 12 (shown in FIG. 1) receives 252 the request, server system 12 accesses 256 database 20 (shown in FIG. 1). System 10 determines 260 if additional narrowing options are available. In one embodiment, additional narrowing options include CA calendar and CA audit tracking selection pull-down lists. If additional narrowing options are available 264, system 10 displays 240 the options relating to the prior option selected by the user on client system 14. The user selects 244 the desired option and transmits the request 248. Server system 12 receives the request 252 and accesses 256 database 20. When system 10 determines that additional options 260 are not available 268, system 10 retrieves 272 requested information from database 20. The requested information is downloaded 276 and provided 280 to client system 14 from server 12. Client system 14 transmits a report 282 to manager workstation 56 (shown in FIG. 2) relating to the CA tasks performed at the specific site location for a specified period of time. The user can continue to search 284 database 20 for other information or exit 290 from system 10.

Figure 5:
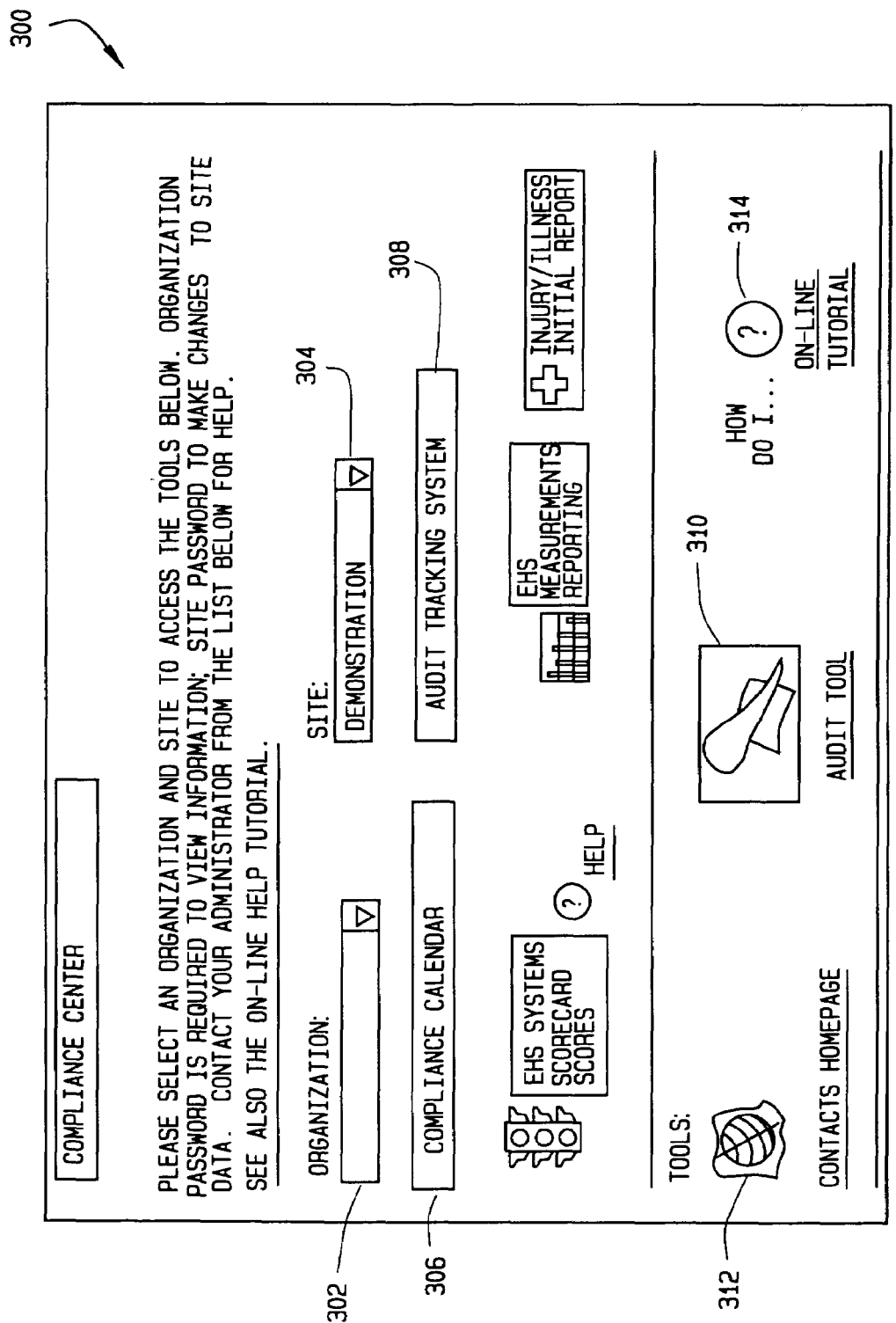
FIG. 5 is an exemplary embodiment of a user interface displaying a home page of CACS.

FIG. 5 is an exemplary embodiment of a user interface 300 displaying a home page of CACS 10 (shown in FIG. 1). User interface 300 requires the user to input an organization 302 and a site location 304. The exemplary embodiment shows organization field 302 and site location field 304 as pull-down lists, however, other means for inputting this information could also be used, e.g., check boxes. User interface 300 is the entry point for anyone trying to access database 20 via the web. In addition, in the exemplary embodiment, user interface, i.e., web page, 300 provides a user with selectable hyperlink options including a Compliance Calendar 306, an Audit Tracking System 308, an Audit Tool 310, a Contacts Homepage 312, and an online tutorial 314. After inputting the necessary information in organization 302 and site location 304, the user selects between hyperlink options Compliance Calendar 306, Audit Tracking System 308, Audit Tool 310, Contacts Homepage 312, and online tutorial 314. In another exemplary embodiment, user interface 300 provides the user with selectable pull-down list options, check boxes, or radio buttons.

Figure 6:
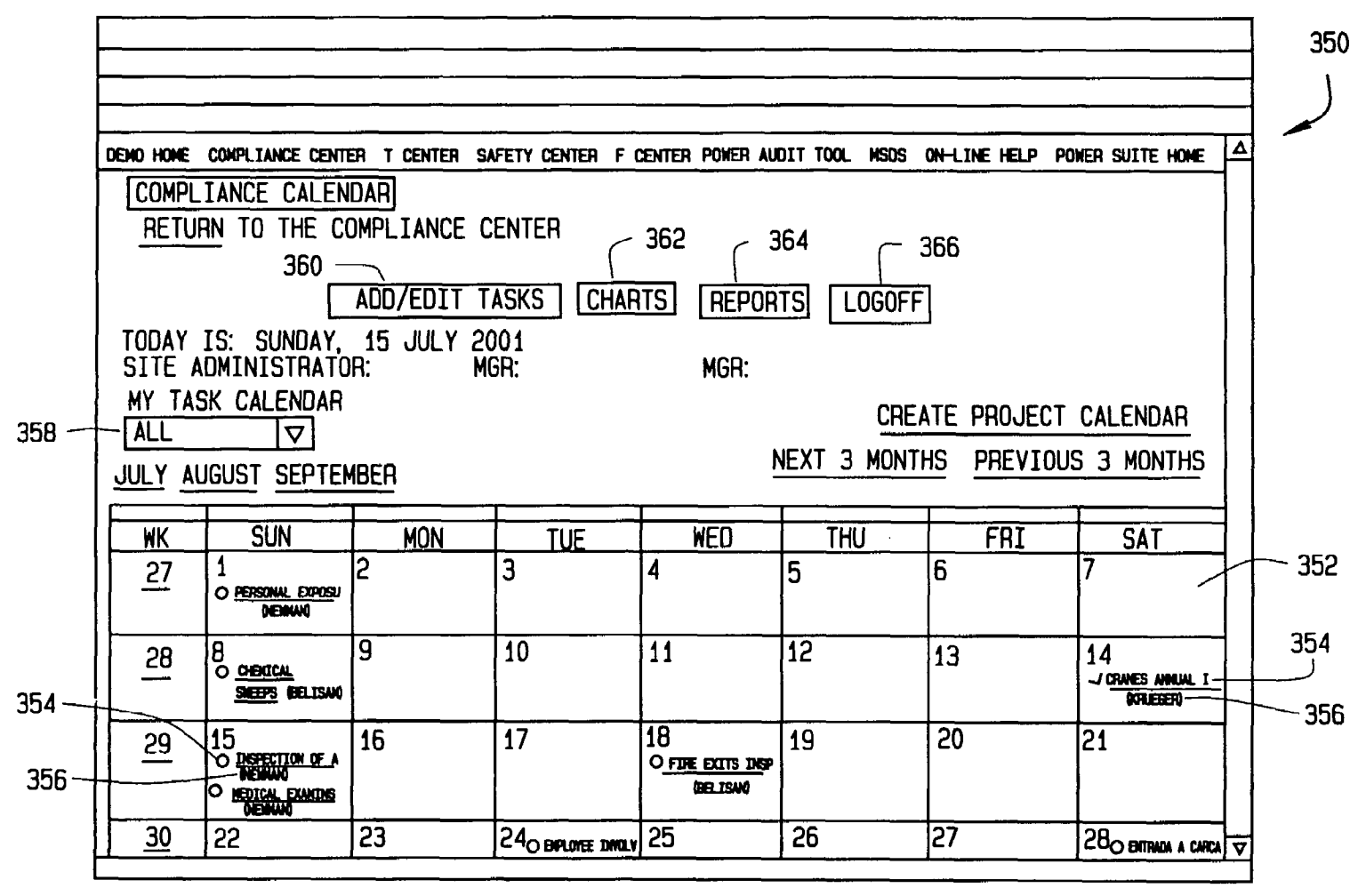

FIG. 6 is an exemplary embodiment of a user interface 350 displaying a home page of Compliance Calendar 306 (shown in FIG. 5). User interface 350 displays a CA calendar 352 for a selected site location. CA calendar 352 also shows CA tasks 354 to be performed on certain specified days at the site location and an assigned contact person 356 for those tasks. Pull-down list 358 allows the user to display CA tasks 354 based on the assigned contact person 356. In the exemplary embodiment, CA tasks 354 are hyperlinks which allow the user to select and display additional information relating to selected CA task 354. User interface 350 also provides selectable hyperlinks including at least one of an Add/Edit Tasks link 360, Charts link 362, Reports link 364, and Logoff link 366. Add/Edit Tasks link 360 allows the user to add and/or edit the CA information inputted for selected CA task 354, including the scheduling of selected CA task 354. Charts link 362 allows the user to chart the CA information by CA task 354, assigned contact person 356, and time period. Reports link 364 allows a user to electronically notify other users and designate an assigned contact person for upcoming CA tasks and CA deadlines.

Figure 7:
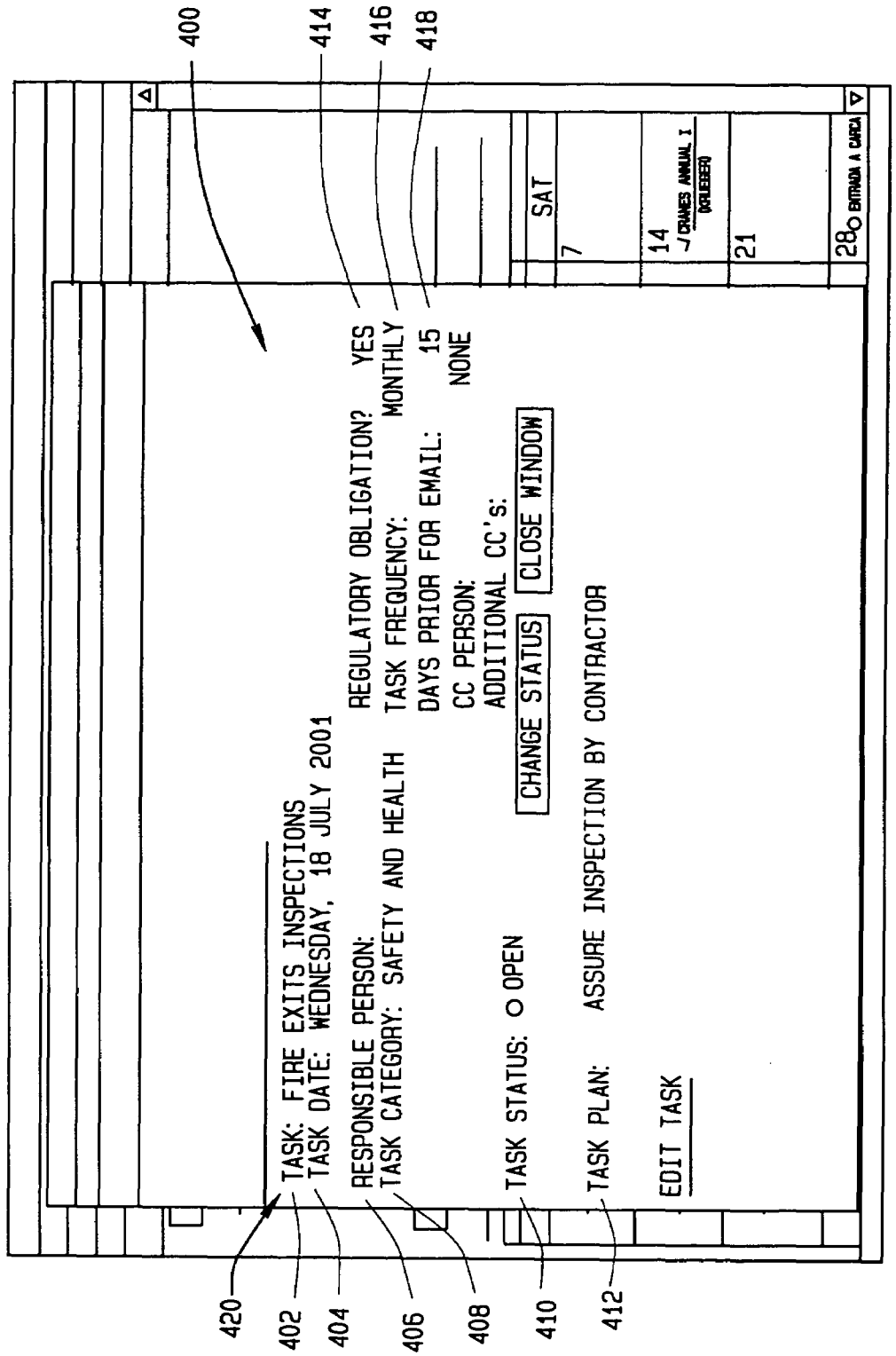
FIG. 7 is an exemplary embodiment of a user interface of CACS displaying an Add/Edit Task page for the Compliance Calendar.

FIG. 7 illustrates an example user interface 400 associated with Add/Edit Tasks link 360 (shown in FIG. 6). User interface 400, i.e., web page, shown in FIG. 7 is an example only and there are a plurality of variations possible. User interface 400 displays a selected CA task 402, a task date 404, an assigned contact person 406, a task category 408, a task status 410, a task plan 412, whether the task is a regulatory obligation 414, task frequency, 416, and a number of days prior to when a notice email should be sent 418. User interface 400 also allows the user to add and/or edit CA information 420 associated with selected task 402, including the task date 404.

Figure 8:
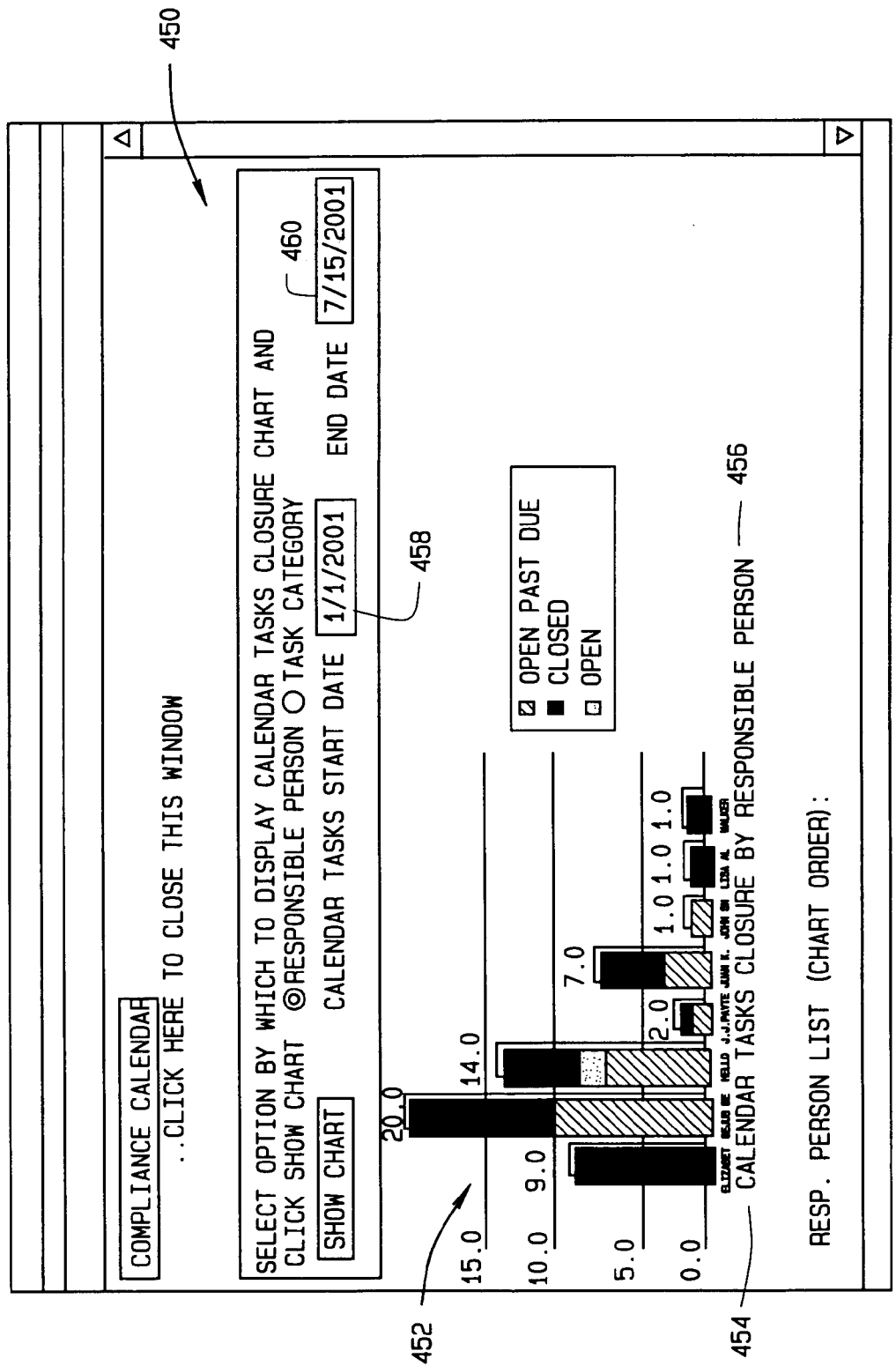
FIG. 8 is an exemplary embodiment of a user interface of CACS displaying a Charts page for the Compliance Calendar.

FIG. 8 illustrates an example user interface 450 associated with Charts link 362 (shown in FIG. 6). User interface 450, i.e., web page, shown in FIG. 8 is an example only and there are a plurality of variations possible. User interface 450 displays a bar graph 452 showing CA calendar tasks 454 by a responsible person 456, and further shows CA calendar tasks 454 as either Open Past Due, Closed, or Open. Web-page 450 further allows a user to chart based on calendar tasks start date 458 and end date 460.

FIG. 9 illustrates an example user interface 500 displaying a monthly task compliance summary report 502 for certain selected site locations. Summary report 502 is transmitted to an assigned business manager workstation 56 (shown in FIG. 2). User interface 500, i.e., web page, shown in FIG. 9 is an example only and there are a plurality of variations possible. User interface 500 displays summary report 502 for each site 504 assigned to the manager user. Summary report 502 also displays the following information for each site 504: active tasks 506, tasks completed year to date 508, total tasks year to date 510, percentage of tasks completed year to date 512, total tasks past due 514, assigned administrator 516, and assigned managers 518. Summary report 502 provides the manager user with a summary of the CA tasks performed at a selected site location for a selected period of time such that managerial oversight of the CA information is facilitated and compliance with certain laws, rules, regulations, standards, and policies relating to certain topics including at least one of environment, health and safety, quality, legal, and corporate compliance is assured.

FIG. 10 illustrates an example user interface 550 displaying a monthly task compliance status report 552 for certain selected site locations. Status report 552 is transmitted to an assigned operations manager workstation 56 (shown in FIG. 2). User interface 550, i.e., web page, shown in FIG. 10 is an example only and there are a plurality of variations possible. Web page 550 displays summary report 552 by assigned person 554 assigned to the managerial user. Summary report 552 also displays at least the following information for each assigned person 554: monthly completed tasks 556, total monthly tasks 558, percentage of monthly tasks completed 560, year to date completed tasks 562, year to date total tasks 564, percentage of year to date tasks completed 566, and total tasks past due 568. Summary report 552 provides the managerial user with a summary of the CA tasks performed at an assigned site location for a selected period of time such that managerial oversight of the CA information is facilitated and compliance with certain laws, rules, regulations, standards, and policies relating to certain topics including at least one of environment, health and safety, quality, legal, and corporate compliance is assured.

Figure 11:
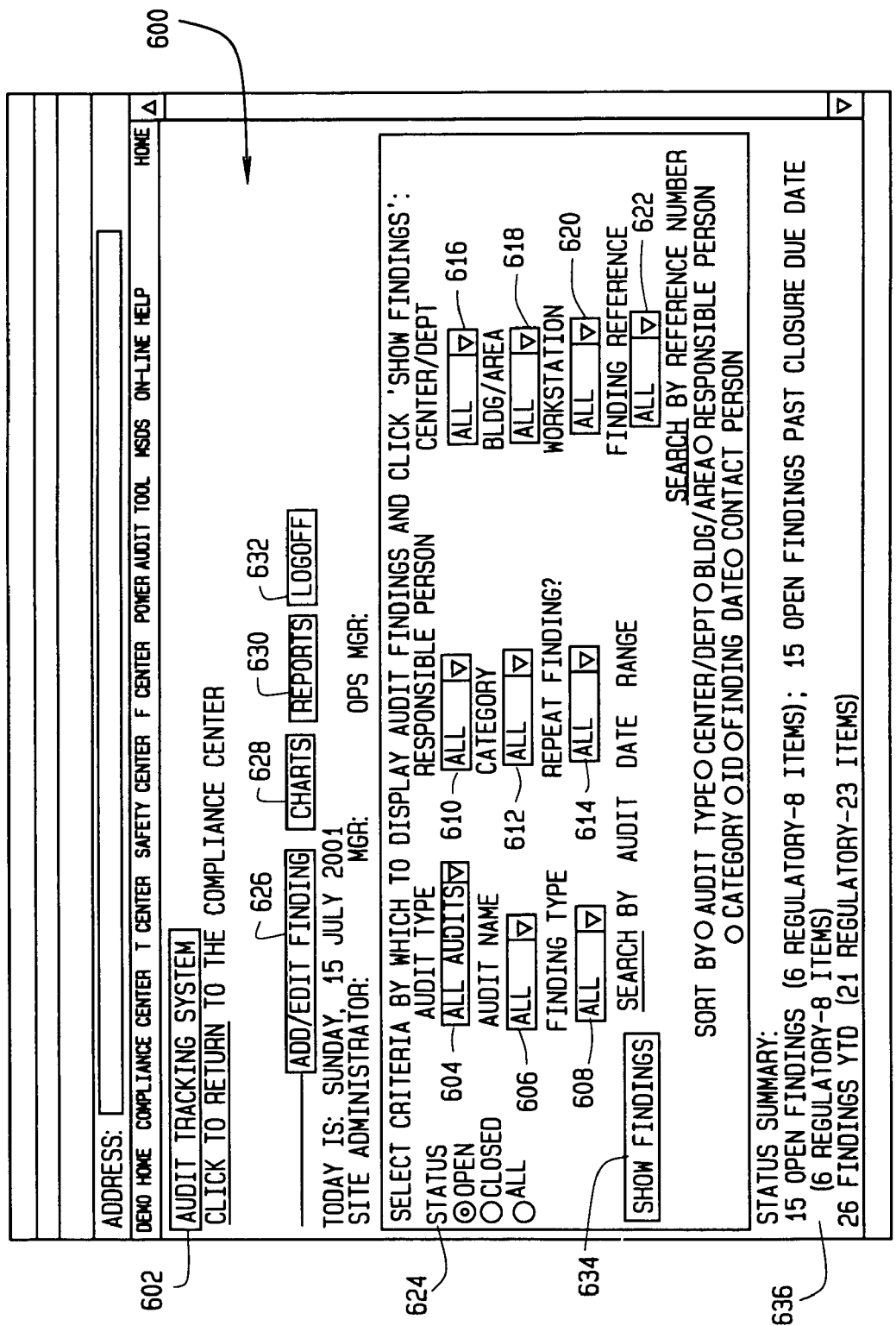
FIG. 11 is an exemplary embodiment of a user interface of CACS displaying an Audit Tracking System.

FIG. 11 is an exemplary embodiment of a user interface 600 displaying a home page of Audit Tracking System 308 (shown in FIG. 5). User interface 600 displays a CA Audit Tracking System 602 for a selected site location. In the exemplary embodiment, CA Audit Tracking System 602 displays pull-lists prompting the user for the following: audit type 604, audit name 606, finding type 608, responsible person 610, category 612, repeat finding 614, center/department 616, building/area 618, workstation 620, and finding reference 622. Pull-down lists 604, 606, 608, 610, 612, 614, 616, 618, 620, and 622 allow the user to input CA audit information. CA Audit Tracking System 602 also provides a status selection 624 which allows the user to display either Open CA audits or Closed CA audits or both. User interface 600 also provides selectable hyperlinks including an Add/Edit Tasks link 626, Charts link 628, Reports link 630, and Logoff link 632. Add/Edit Tasks link 626 allows the user to add and/or edit CA audit information inputted into CA Audit Tracking System 602. Charts link 628 allows the user to chart CA audit information. Reports link 630 allows the user to electronically notify other users and designate an assigned contact person for upcoming CA audit tasks and CA audit deadlines. User interface 600 also has a Show Findings button 634 that allows the user to sort CA audit information through the use of radio buttons and display a status summary 636.

Figure 12:
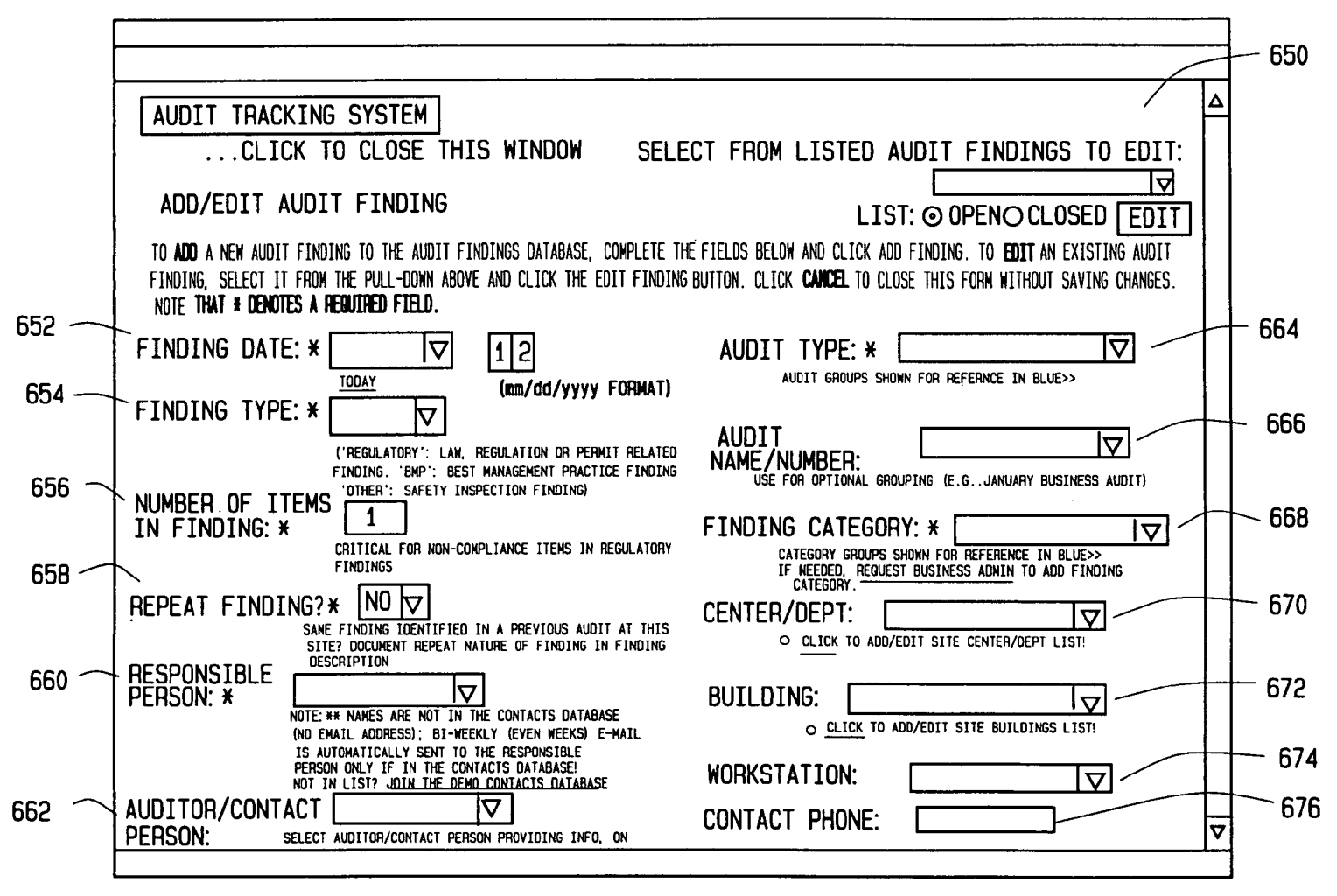

FIG. 12 illustrates an example user interface 650 associated with Add/Edit Tasks link 626 (shown in FIG. 11) shown on CA Audit Tracking System user interface 600 (shown in FIG. 11). User interface 650, i.e., web page, shown in FIG. 12 is an example only and there are a plurality of variations possible. In the exemplary embodiment, user interface 650 prompts the user to input CA audit information with a plurality of pull-down lists including: finding date 652, finding type 654, number of items in finding 656, repeat finding 658, responsible person 660, auditor/contact person 662, audit type 664, audit name/number 666, finding category 668, center/department 670, building 672, workstation 674, and contact phone 676. Pull-down lists 652, 654, 656, 658, 660, 662, 664, 666, 668, 670, 672, 674, and 676 allow the user to add and/or edit the CA audit information.

Figure 13:
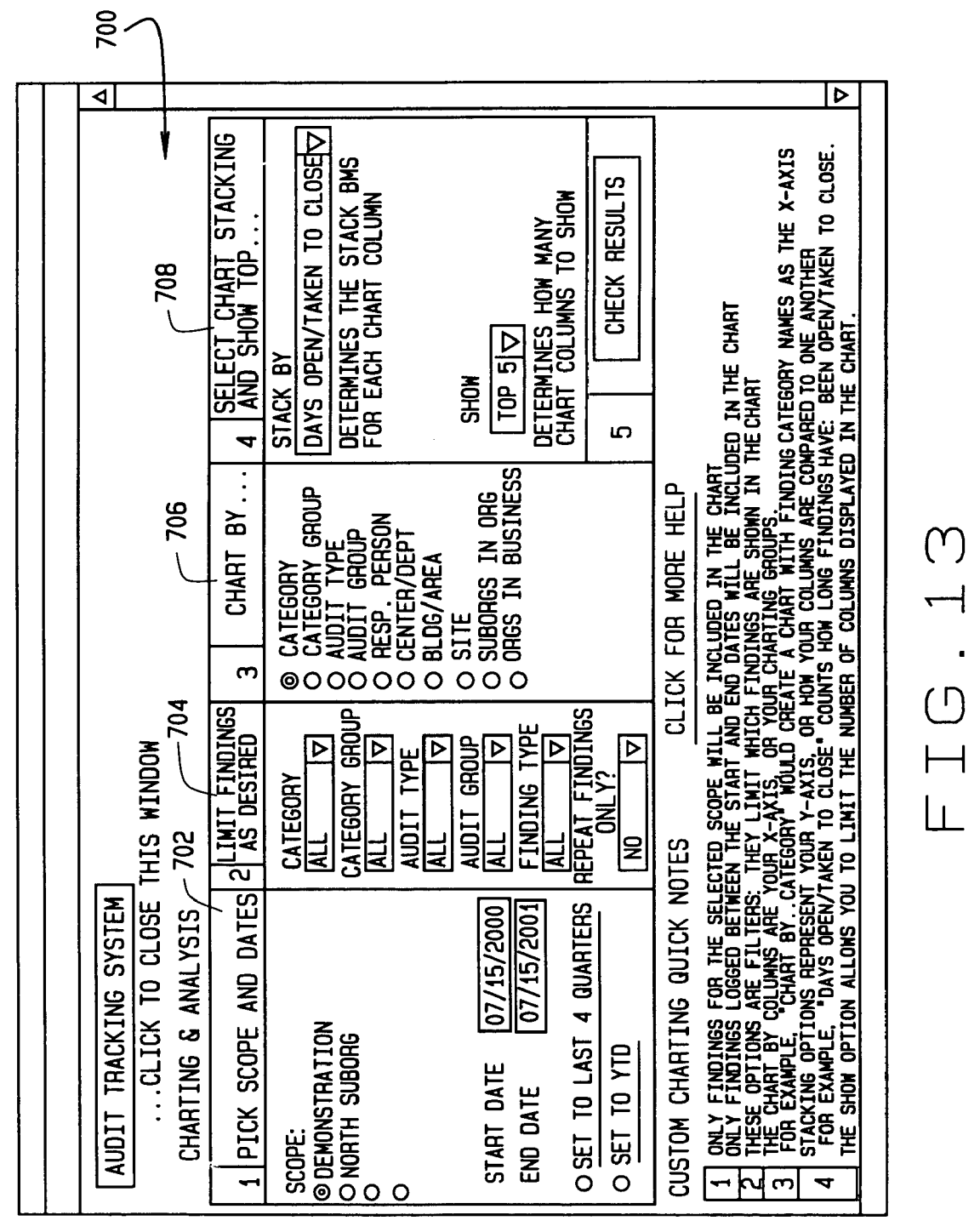

FIG. 13 illustrates an example user interface 700 associated with Charts link 628 (shown in FIG. 11) shown on CA Audit Tracking System user interface 600 (shown in FIG. 11). User interface 700, i.e., web page, shown in FIG. 13 is an example only and there are a plurality of variations possible. User interface 700 allows the user to chart CA audit information based on at least the following: scope and date 702, findings as desired 704, chart by 706, and select chart stacking and show top 708. In the exemplary embodiment, user interface 700 prompts the user under topics 702, 704, 706, and 708 to input CA audit information through a plurality of pull-down lists, data fields, and radio buttons.

FIG. 14 illustrates an example user interface 750 displaying a bi-weekly audit findings status report 752 for selected site locations. Status report 752 is transmitted to assigned site manager, operations manager, and responsible person at manager workstations 56 (shown in FIG. 2). User interface 750 shown in FIG. 14 is an example only and there are a plurality of variations possible. User interface 750 displays summary report 752 of open audit findings 754. Open audit findings 754 is further shown on user interface 750 as open findings 756 and open past due findings 758. Summary report 752 provides the manager users with a summary of CA audit information for a selected site location for a selected period of time such that managerial oversight of the CA audit information is facilitated and compliance with certain laws, rules, regulations, standards, and policies relating to certain topics including at least one of environment, health and safety, quality, legal, and corporate compliance is assured.

FIG. 15 illustrates an example user interface 800 displaying a bi-weekly audit findings summary report 802 for selected site locations. Summary report 802 is transmitted to assigned business manager workstation 56 (shown in FIG. 2). User interface 800 shown in FIG. 15 is an example only and there are a plurality of variations possible. User interface 800 displays summary report 802 for each selected site location 804 and displays an assigned administrator 806, an assigned manager 808, a last finding date 810, an audit days old section 812, and an audit closure rate section 814. Summary report 802 provides the business manager user with a summary of the CA audit information at selected site locations for a selected period of time such that managerial oversight of the CA audit information is facilitated and compliance with certain laws, rules, regulations, standards, and policies relating to certain topics including at least one of environment, health and safety, quality, legal, and corporate compliance is assured.

Figure 16:
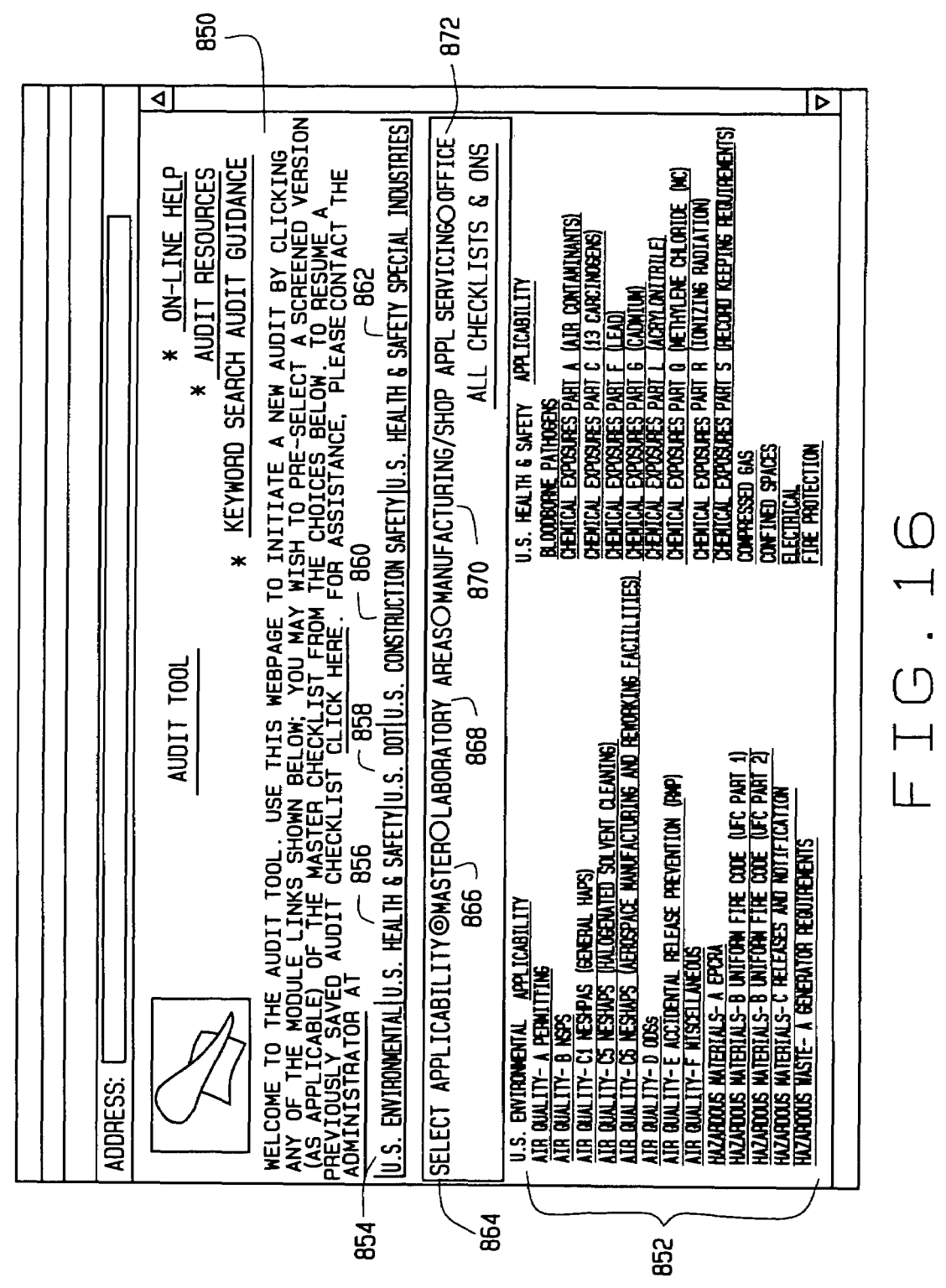

FIG. 16 is an exemplary embodiment of a user interface 850 displaying a home page of Audit Tool 310 (shown in FIG. 5). User interface 850 shown in FIG. 16 is an example only and there are a plurality of variations possible. User interface 850 allows a user to access a plurality of audit checklists 852. In the exemplary embodiment, audit checklists 852 are hyperlinks that allow the user to access and display a selected audit checklist. Audit checklists 852 are categorized by topic. User interface 850 displays at least one of the following audit checklist category topics: U.S. Environmental 854, U.S. Health & Safety 856, U.S. DOT 858, U.S. Construction Safety 860, and U.S. Health & Safety Special Industries 862. In the exemplary embodiment, the audit checklist category topics shown on user interface 850 are hyperlinks that allow the user to access and display the audit checklists associated with the selected category. In addition, user interface 850 allows the user to sort and display audit checklists 852 based on applicability. In the exemplary embodiment, an applicability sort function 864 uses radio buttons that include: Master 866, Laboratory Areas 868, Manufacturing/Shop Appl. Servicing 870, and Office 872. Although radio buttons are shown for applicability sort function 864, other such inputting means could also be employed, including pull-down lists, check boxes, or hyperlinks. User interface 850 also allows a user to save a selected audit checklist.

FIG. 17 illustrates an example user interface 900 of a selected audit tool checklist 852 (shown in FIG. 16). User interface 900 shown in FIG. 17 is an example only and there are a plurality of variations possible. In the exemplary embodiment, user interface 900 displays a plurality of pull-down menus and data fields that allow a user to input information relating to a selected site location and selected audit checklist 852. The pull-down menus and data fields include the following: Organization 902, Site 904, Location Detail 906, Audit dates 908, Auditors & General Comments 910. User interface 900 also provides an Update and Save button 912, a Make Report button 914, a Print Checklist button 916, and instructions 918 on responding to selected audit tool checklist 852.

FIG. 18 illustrates an example user interface 950 of a saved audit checklist summary 952. Saved audit checklist summary 952 is associated with an audit checklist selected from audit checklists 852 (shown in FIG. 16). User interface 950 shown in FIG. 18 is an example only and there are a plurality of variations possible. Saved audit checklist summary 952 provides the user with a summary of the CA audit information at selected site locations for a selected period of time such that oversight of the CA audit information is facilitated and compliance with certain laws, rules, regulations, standards, and policies relating to certain topics including at least one of environment, health and safety, quality, legal, and corporate compliance is assured.

Figure 19:
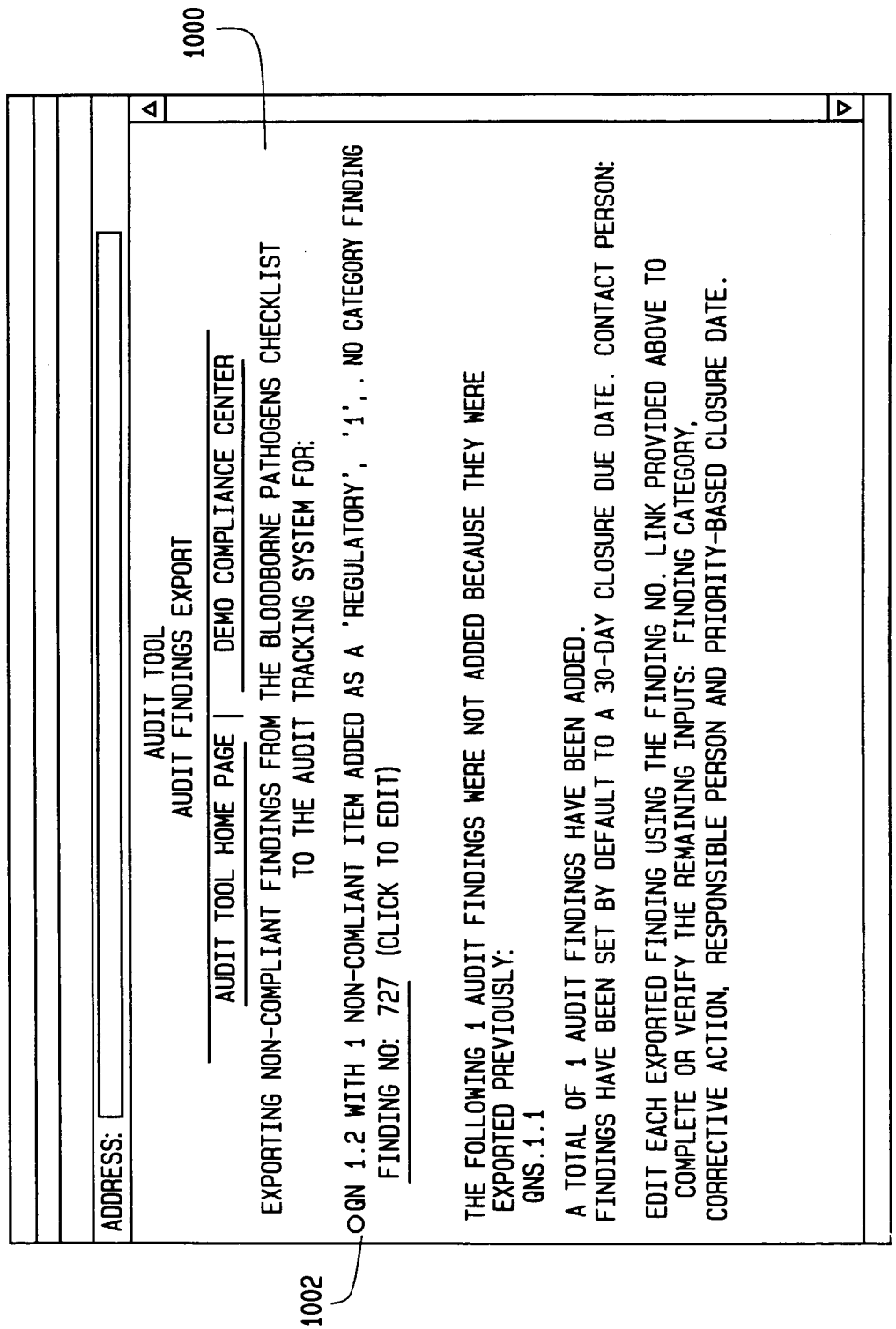
FIG. 19 is an exemplary embodiment of a user interface of CACS displaying an audit findings report.

FIG. 19 illustrates an example user interface 1000 of an audit findings report 1002. Audit findings report 1002 is associated with an audit checklist selected from audit checklists 852 (shown in FIG. 16). User interface 1000 shown in FIG. 19 is an example only and there are a plurality of variations possible. Audit findings report 1002 provides the user with a summary of the CA audit information at selected site locations for a selected period of time such that oversight of the CA audit information is facilitated and compliance with certain laws, rules, regulations, standards, and policies relating to certain topics including at least one of environment, health and safety, quality, legal, and corporate compliance is assured.

Figure 20:
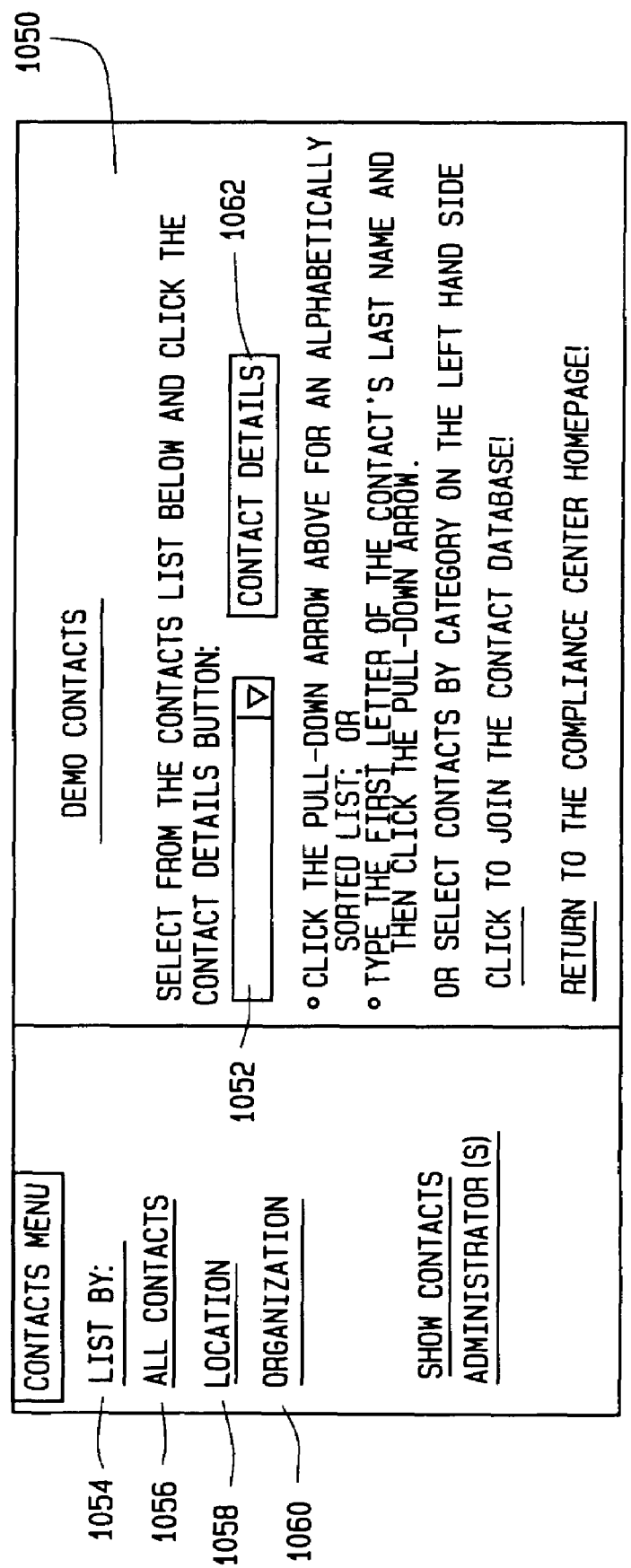
FIG. 20 is an exemplary embodiment of a user interface of CACS displaying a Contacts Homepage.

FIG. 20 is an exemplary embodiment of a user interface 1050 displaying a home page of Contacts Homepage 312 (shown in FIG. 5). User interface 1050 shown in FIG. 20 is an example only and there are a plurality of variations possible. User interface 1050 allows a user to search for a contact person and access the contact person''s contact information. The contact person would be involved with at least one CA audit tasks. In the exemplary embodiment, a pull-down list of contact persons 1052 is provided on user interface 1050. The user can select a contact person from pull-down list 1052. In addition, user interface 1050 provides a sorter 1054 for sorting contact persons on pull-down list 1052. In the exemplary embodiment, the sorter includes an All Contacts link 1056, a Location link 1058, and an Organization link 1060. User interface 1050 also provides a Contacts Details button 1062 which, when selected, provides the user with the selected contact person's contact information.

FIG. 21 illustrates an example user interface 1100 for inputting a contact person's contact information 1102. User interface 1100 shown in FIG. 21 is an example only and there are a plurality of variations possible. User interface 1100 allows a user to add or edit contact information 1102. In the exemplary embodiment, user interface 1100 displays a plurality of pull-down lists and data fields that allow a user to input contact information 1102. The pull-down lists and data fields include at least one of the following: Full Name 1104, Title 1106, First Name 1108, DialComm Phone 1110, Organization 1112, Location 1114, Building 1116, Address 1118, Last Name 1120, External Phone 1122, Fax 1124, Cell Phone/Pager 126, Home Phone 1128, Internet Email Address 1130, and Expertise/Responsibility 1132.

FIG. 22 is a list 1150 of at least some of the data tables 1152 and key fields 1154 used within Plant Information Section (PIS) 92 (shown in FIG. 3) in database 20 (shown in FIG. 3). List 1150 shown in FIG. 22 is an example only and there are a plurality of variations possible. List 1150 includes the information that might be used by either Compliance Calendar 306 or Audit Tracking System 308 (both shown in FIG. 5). Data tables 1152 shown on list 1150 include: Org. 1156, Site 1158, Contact 1160, COE/department 1162, and Building 1164. The key fields 1154 shown below data table Org. 1156 include: orgname 1166, table 1168, orgpassword 1170, business 1172, administrator 1174, and suborg 1176. The key fields 1154 shown below data table Site 1158 include: location 1178, admin 1180, password 1182, suborg 1184, atscc on 1186, project 1188, and subsite 1190. The key fields 1154 shown below data table Contact 1160 include: contact name 1192, contact last name 1194, contact first name 1196, contact phone 1198, contact title 1200, EHS dedicated 1202, contact location 1204, contact org 1206, and contact email 1208. The key fields 1154 shown below data table COE/department 1162 include: location 1210, COE/department 1212, subsite 1214, and archive 1216. The key fields 1154 shown below data table Building 1164 include: location 1218, and building 1220.

FIG. 23 is a list 1300 of at least some of the data tables 1302 and key fields 1304 used within CA Audit Tracking System Section (CAATSS) 96 (shown in FIG. 3) in database 20 (shown in FIG. 3). List 1300 shown in FIG. 23 is an example only and there are a plurality of variations possible. Data tables 1302 shown on list 1300 include: Audit 1306, Audit Type 1308, Category 1310, and Closure 1312. The key fields 1304 shown below data table Audit 1306 include: location 1314, ID 1316, audit name 1318, audit date 1320, audit type 1322, finding type 1324, category 1326, citation 1328, numitems 1330, repeatitem 1332, classification type 1334, COE/department 1336, bldg 1338, workstation 1340, responperson 1342, description 1344, corrective action 1346, contact person 1348, contact phone 1350, close date 1352, close comment 1354, close person 1356, status 1358, closure due date 1360, update date 1362, and update user 1364. The key fields 1304 shown below data table Audit Type 1308 include: audit name 1366, and audit group 1368. The key fields 1304 shown below data table Category 1310 include: category 1370, and super category 1372. The key fields 1304 shown below data table Closure 1312 include: closure 1374.

FIG. 24 is a list 1400 of at least some of the data tables 1402 and key fields 1404 used within CA Calendar Section (CCS) 94 (shown in FIG. 3) in database 20 (shown in FIG. 3). List 1400 shown in FIG. 24 is an example only and there are a plurality of variations possible. Data tables 1402 shown on list 1400 include: Task 1406, Calendar Media 1408, Task Reminder 1410, Task Reminder Archive 1412, and Frequency 1414. The key fields 1404 shown below data table Task 1406 include: location 1416, task name 1418, resp person 1420, resp cc 1422, mult cc 1424, media 1426, remind 1428, first rem date 1430, rem freq 1432, rem days prior 1434, reg comp 1436, task plan 1438, weblink 1440, comp 1442, comp date 1444, project 1446, and update date 1448. The key fields 1404 shown below data table Calendar Media 1408 include: media 1450. The key fields 1404 shown below data table Task Reminder 1410 include: location 1452, task name 1454, reminder date 1456, resp person 1458, complete 1460, complete date 1462, comment 1464, and reminder plan 1466. The key fields 1404 shown below data table Task Reminder Archive 1412 include: location 1468, task name 1470, reminder date 1472, resp person 1474, complete 1476, complete date 1478, comment 1480, and reminder plan 1482. The key fields 1404 shown below data table Frequency 1414 include: type 1484.

While the invention has been described in terms of various specific embodiments, those skilled in the art will recognize that the invention can be practiced with modification within the spirit and scope of the claims.

The invention claimed is:

1. A method for managing, storing, and disseminating compliance assurance (CA) information for a business entity using a web-based system including a server system coupled to a centralized interactive database and at least one client system, said method comprising:

receiving CA information relating to the business entity at the server system from a client system;

creating within the centralized database a hierarchy of business units included within the business entity, wherein the hierarchy of business units includes at least a business entity level, an organization level, a site level, a department level and a building level, and wherein the organization level is a predefined sub-portion of the business entity level, the site level is a predefined sub-portion of the organization level, the department level is a predefined sub-portion of the site level, and the building level is another predefined sub-portion of the site level;

storing CA information and a plurality of predetermined audit checklists within the centralized database including organizing the stored CA information based on the hierarchy of business units such that CA information is retrievable and displayable by at least one of the business units included within the hierarchy of business units, wherein the CA information includes CA tasks to be performed and a responsible person assigned to each task at each business unit included within each level within the hierarchy of business units;

cross-referencing CA information at the server system;

updating the centralized database periodically using the server system to maintain CA information;

electronically displaying on a client system a compliance calendar option, an audit tracking option, and audit tool option, wherein the compliance calendar option causes to be displayed on the client system CA tasks to be performed and corresponding CA deadlines, wherein the audit tracking option prompts the user to input audit information, and wherein the audit tool option prompts the user to select at least one audit checklist from the plurality of predetermined audit checklists stored within the database;

processing at the server system an inquiry submitted by the user including a selection of one of the options displayed on the client system and a selected business unit included within the hierarchy of business units;

providing CA information in response to the inquiry including CA information for the selected business unit including providing the CA tasks and the responsible person assigned to each CA task for the selected business unit;

notifying users electronically of CA tasks to be performed at the selected business unit and corresponding CA deadlines;

tracking the CA tasks to be performed at the selected business unit and the corresponding CA deadlines to ensure compliance;

determining, using the server system, at a selected time active CA tasks, CA tasks completed year to date, total CA tasks year to date, percentage of CA tasks completed year to date, and total CA tasks past due for a plurality of locations assigned to a manager; and generating a CA task summary report for the manager responsible for managing compliance for the plurality of locations, wherein for each location being managed by the manager the summary report displays: active CA tasks, CA tasks completed year to date, total CA tasks year to date, percentage of CA tasks completed year to date, and total CA tasks past due.

2. A method in accordance with claim 1 wherein creating within the centralized database a hierarchy of business units further comprises storing CA information within the database based on the hierarchy of business units such that CA information is retrievable and displayable in response to a selected business entity included within the business entity level, or by a selected organization included within the organization level corresponding to the selected business entity, or by a selected site which is included within the site level corresponding to the selected organization, or by a selected department which is included within the department level corresponding to the selected site, or by a selected building that is included within the building level corresponding to the selected department.

3. A method in accordance with claim 1 wherein cross-referencing CA information further comprises compiling a user schedule using CA information regarding tasks being performed.

4. A method in accordance with claim 1 wherein providing CA information comprises:

displaying information to a user identifying at least one of a site location and a CA task to be performed at the site location; and receiving an inquiry from the client system regarding at least one of the site location and the CA task to be performed at the site location.

5. A method in accordance with claim 1 wherein providing CA information comprises:

displaying information on the client system regarding at least one of a site location, CA calendar, CA audit tracking system, CA audit tool, and CA contacts information; and receiving an inquiry from the client system regarding at least one of the site location, CA calendar, CA audit tracking system, CA audit tool, and CA contacts information.

6. A method in accordance with claim 1 wherein providing CA information comprises providing business information, organizational information, site information, assigned contact person information, COE/department information, building information, CA audit tracking information, CA task information, CA calendar information, CA task reminder information, frequency of reminder information, environmental information, health and safety information, quality information, legal information, human resources information, management information, and corporate compliance information.

7. A method in accordance with claim 1 wherein notifying users comprises transmitting an electronic message to the client system from the server system notifying at least one user of a CA task to be performed and a CA audit tracking task to be performed.

8. A method in accordance with claim 1 further comprising connecting the client system and the server system via a network that includes one of a wide area network, a local area network, an intranet and the Internet.

9. A method in accordance with claim 1 wherein displaying on a client system the audit tool option further comprises displaying topical categories on the client system wherein each of the predetermined audit checklists are organized within one of the topical categories, wherein the topical categories including environmental, health and safety, transportation, and construction safety.

10. A method in accordance with claim 9 wherein displaying on a client system the audit tool option further comprises enabling the user to select a topical category to display each of the predetermined audit checklists organized within the selected topical category.

11. A method in accordance with claim 1 wherein storing CA information further comprises:

storing within the database, for each level of the hierarchy of business units, a responsible person assigned to each task, wherein the responsible person for a given CA task may be different at each level of the hierarchy of business units.

12. A method for managing, storing, and disseminating compliance assurance (CA) information for a business entity using a web-based system including a server system coupled to a centralized interactive database, at least one managerial user system, and at least one client system, said method comprising:

receiving CA information relating to the business entity at the server system from a client system, said CA information comprising site information including environmental information, health and safety information, legal information, corporate compliance information, and contacts information;

creating within the centralized database a hierarchy of business units within the business entity, wherein the hierarchy of business units includes at least a business entity level, an organization level, a site level, a department level and a building level, and wherein the organization level is a predefined sub-portion of the business entity level, the site level is a predefined sub-portion of the organization level, the department level is a predefined sub-portion of the site level, and the building level is another predefined sub-portion of the site level;

storing CA information and a plurality of predetermined audit checklists within the centralized database including organizing the stored CA information based on the hierarchy of business units such that CA information is retrievable and displayable by at least one of the business units included within the hierarchy of business units, wherein the CA information includes CA tasks to be performed and a responsible person assigned to each task at each business unit in each level within the hierarchy of business units;

cross-referencing CA information at the server system;

updating the centralized database periodically using the server system to maintain CA information;

electronically displaying on a client system a compliance calendar option, an audit tracking option, and audit tool option, wherein the compliance calendar option causes to be displayed on the client system CA tasks to be performed and corresponding CA deadlines, wherein the audit tracking option prompts the user to input audit information, and wherein the audit tool option prompts the user to select at least one audit checklist from the plurality of predetermined audit checklists stored within the database;

processing at the server system an inquiry submitted by the user including a selection of one of the options displayed on the client system and a selected business unit included within the hierarchy of business units;

providing CA information in response to the inquiry including CA information for the selected business unit including providing the CA tasks and the responsible person assigned to each CA task for a selected level within the hierarchy of business units;

notifying users electronically of CA tasks to be performed at the selected business unit and corresponding CA deadlines;

tracking the CA tasks to be performed at the selected business unit and the corresponding CA deadlines to ensure compliance;

determining, using the server system, at a selected time active CA tasks, CA tasks completed year to date, total CA tasks year to date, percentage of CA tasks completed year to date, and total CA tasks past due for a plurality of locations assigned to a manager; and generating a CA task summary report for the manager responsible for managing compliance for the plurality of locations, wherein for each location being managed by the manager the summary report displays: active CA tasks, CA tasks completed year to date, total CA tasks year to date, percentage of CA tasks completed year to date, and total CA tasks past due.

13. A method in accordance with claim 12 wherein creating within the centralized database a hierarchy of business units further comprises storing CA information within the database based on the hierarchy of business units such that CA information is retrievable and displayable in response to a selected business entity included within the business entity level, or by a selected organization included within the organization level corresponding to the selected business entity, or by a selected site which is included within the site level corresponding to the selected organization, or by a selected department which is included within the department level corresponding to the selected site, or by a selected building that is included within the building level corresponding to the selected department.

14. A method in accordance with claim 12 wherein processing at the server comprises using the audit tool to process the CA information to assure compliance with certain laws, rules, regulations, standards, and policies.

15. A method in accordance with claim 12 wherein notifying users comprises transmitting an electronic message to the client system from the server system notifying the user of the CA tasks to be performed within a time period shown on the CA calendar such that compliance with certain laws, rules, regulations, standards, and policies relating to certain topics including at least environment, health and safety, quality, legal, and corporate compliance is assured.

16. A method in accordance with claim 12 wherein providing an electronic report comprises transmitting an electronic report to the managerial user system from the server system comprising a summary of the CA tasks performed at a site location for a time period shown on the CA calendar such that managerial oversight of the CA information is facilitated and compliance with certain laws, rules, regulations, standards, and policies relating to certain topics including at least one of environment, health and safety, quality, legal, and corporate compliance is assured.

17. A method in accordance with claim 12 wherein storing CA information further comprises:

storing within the database, for each level of the hierarchy of business units, a responsible person assigned to each task, wherein the responsible person for a given CA task may be different at each level of the hierarchy of business units.

18. A method for manipulating CA information for a business entity using a web-based system including a server system coupled to a centralized interactive database and at least one client system, said method comprising:

receiving CA information relating to the business entity at the server system comprising business information, organizational information, site information, assigned contact person information, COE/department information, building information, CA audit tracking information, CA task information, CA calendar information, CA task reminder information, frequency of reminder information, environmental information, health and safety information, quality information, legal information, human resources information, management information, and corporate compliance information;

creating within the centralized database a hierarchy of business units included within the business entity, the hierarchy of business units including at least a business entity level, an organization level, a site level, a department level and a building level, and wherein the organization level is a predefined sub-portion of the business entity level, the site level is a predefined sub-portion of the organization level, the department level is a predefined sub-portion of the site level, and the building level is another predefined sub-portion of the site level;

storing CA information and a plurality of predetermined audit checklists within the centralized database including organizing the stored CA information based on the hierarchy of business units such that CA information is retrievable and displayable by at least one of the business units included within the hierarchy of business units, wherein the CA information includes a responsible person assigned to each task at each business unit of each level within the hierarchy of business units;

updating the centralized database with CA information comprising adding and deleting information so as to revise existing CA information including at least one of CA task information, CA calendar information, and CA audit tracking information;

electronically displaying on a client system a compliance calendar option, an audit tracking option, and audit tool option, wherein the compliance calendar option causes to be displayed on the client system CA tasks to be performed and corresponding CA deadlines, wherein the audit tracking option prompts the user to input audit information, and wherein the audit tool option prompts the user to select at least one audit checklist from the plurality of predetermined audit checklists stored within the database;

processing at the server system an inquiry submitted by the user including a selection of one of the options displayed on the client system and a selected business unit included within the hierarchy of business units;

providing CA information in response to the inquiry including CA information for the selected business unit including providing the CA tasks and the responsible person assigned to each CA task for the selected business unit;

notifying the responsible person assigned to each CA task for the selected business unit of CA tasks to be performed at the selected business unit and the corresponding CA deadlines comprising transmitting an electronic message to the client system from the server system notifying the responsible person of a CA task to be performed;

determining, using the server system, at a selected time active CA tasks, CA tasks completed year to date, total CA tasks year to date, percentage of CA tasks completed year to date, and total CA tasks past due for a plurality of locations assigned to a manager; and transmitting a CA task summary report to the manager responsible for managing compliance for the plurality of locations, wherein for each location being managed by the manager the summary report displays: active CA tasks, CA tasks completed year to date, total CA tasks year to date, percentage of CA tasks completed year to date, and total CA tasks past due.

19. A network based system for managing, storing, and disseminating CA information for a business entity, said system comprising:

a client system comprising a browser;
a centralized database for storing information;
a server system configured to be coupled to said client system and said database, said server system further configured to:

receive CA information relating to the business entity from the client system;

create within the database a hierarchy of business units included within the business entity, the hierarchy of business units including at least a business entity level, an organization level, a site level, a department level and a building level, and wherein the organization level is a predefined sub-portion of the business entity level, the site level is a predefined sub-portion of the organization level, the department level is a predefined sub-portion of the site level, and the building level is another predefined sub-portion of the site level;

store CA information and a plurality of predetermined audit checklists within the centralized database including organizing the stored CA information based on the hierarchy of business units such that CA information is retrievable and displayable by at least one of the business units included within the hierarchy of business units, wherein the CA information includes a responsible person assigned to each task at each level of the hierarchy of business units;

cross-reference CA information;

update the centralized database periodically to maintain CA information;

electronically display on the client system a compliance calendar option, an audit tracking option, and audit tool option, wherein the compliance calendar option causes to be displayed on the client system CA tasks to be performed and corresponding CA deadlines, wherein the audit tracking option prompts the user to input audit information, and wherein the audit tool option prompts the user to select at least one audit checklist from the plurality of predetermined audit checklists stored within the database;

process an inquiry submitted by the user including a selection of one of the options displayed on the client system and a selected business unit included within the hierarchy of business units;

provide CA information in response to the inquiry including CA information for the selected business unit including providing the CA tasks and the responsible person assigned to each CA task for the selected business unit;

notify electronically the responsible person assigned to each CA task for the selected business unit of CA tasks to be performed at the selected business unit and corresponding CA deadlines;

tracking the CA tasks to be performed at the selected business unit and the corresponding CA deadlines to ensure compliance;

determine at a selected time active CA tasks, CA tasks completed year to date, total CA tasks year to date, percentage of CA tasks completed year to date, and total CA tasks past due for a plurality of locations assigned to a manager; and transmit a CA task summary report to the manager responsible for managing compliance for the plurality of locations, wherein for each location being managed by the manager the summary report displays: active CA tasks, CA tasks completed year to date, total CA tasks year to date, percentage of CA tasks completed year to date, and total CA tasks past due.

20. A system in accordance with claim 19 wherein said client system further comprises at least one of:
- a displaying component for displaying at least one of a pull-down list, a check box, and hypertext link options relating to CA audit tracking information and CA scheduling information;
- a sending component to send an inquiry to the server system so that the server system can process and download the requested information to the client system;
- a collection component for collecting CA information from users into the centralized database;
- a tracking component for tracking CA information;
- a displaying component for displaying CA information on at least one site location;
- a receiving component for receiving an inquiry from the client system regarding at least one of business information, organizational information, site information, assigned contact person information, COE/department information, building information, CA audit tracking information, CA task information, CA calendar information, CA task reminder information, frequency of reminder information, environmental information, health and safety information, quality information, legal information, human resources information, management information, and corporate compliance information;
- an accessing component for accessing the centralized database and causing the retrieved information to be displayed on the client system; and
- a notifying component for electronically notifying users of CA tasks and CA deadlines.

21. A system in accordance with claim 19 wherein said server system further comprises a processing component for searching and processing received inquiries against the database containing information collected by the collection component, and for cross-referencing at least one of CA calendar information, CA task information, and CA audit tracking information.

22. A system in accordance with claim 19 wherein said server system is further configured to store CA information within the database based on the hierarchy of business units such that CA information is retrievable and displayable in response to a selected business entity included within the business entity level, or by a selected organization included within the organization level corresponding to the selected business entity, or by a selected site which is included within the site level corresponding to the selected organization, or by a selected department which is included within the department level corresponding to the selected site, or by a selected building that is included within the building level corresponding to the selected department.

23. A system in accordance with claim 19 wherein said server system further comprises at least one of a receiving component that receives information directly through the client system, and a receiving component that receives information in a pre-determined format established for inputting CA information.

24. A system in accordance with claim 19 wherein said server system further comprises a cross-referencing component that accomplishes at least one of:
- compiling a user schedule using CA information regarding CA tasks being performed;
- creating a user CA calendar based on previously created user CA calendars; and
- creating a user CA calendar based on changes in CA audit tracking information.

25. A system in accordance with claim 19 wherein said server system further comprises a notifying component that notifies a user through at least one of transmitting an electronic message to the client system regarding a CA task to be performed, and transmitting an electronic message to the client system regarding a CA audit tracking task to be performed.

26. A system in accordance with claim 19 wherein the CA information may include a different responsible person assigned to each task at different levels of the hierarchy of business units.

27. A network based system for managing, storing, and disseminating CA information for a business entity, said system comprising:
- a client system comprising a browser;
- a managerial user system comprising a browser;
- a centralized database for storing information;
- a server system configured to be coupled to said client system, said managerial user system, and said database, said server system further configured to:
- receive CA information relating to the business entity from the client system, said CA information comprising site information including environmental information, health and safety information, legal information, corporate compliance information, and contact information;
- create within the database a hierarchy of business units included within the business entity, wherein the hierarchy of business units includes at least the business entity level, an organization level, a site level, a department level and a building level, and wherein the organization level is a predefined sub-portion of the business entity level, the site level is a predefined sub-portion of the organization level, the department level is a predefined sub-portion of the site level, and the building level is another predefined sub-portion of the site level;
- store CA information and a plurality of predetermined audit checklists within the centralized database including organizing the stored CA information based on the hierarchy of business units such that CA information is retrievable and displayable by at least one of the business units included within the hierarchy of business units, wherein the CA information includes a responsible person assigned to each task at each business unit included within each level of the hierarchy of business units;
- cross-reference CA information;
- update the centralized database periodically to maintain CA information;
- electronically display on the client system a compliance calendar option, an audit tracking option, and audit tool option, wherein the compliance calendar option causes to be displayed on the client system CA tasks to be performed and corresponding CA deadlines, wherein the audit tracking option prompts the user to input audit information, and wherein the audit tool option prompts the user to select at least one audit checklist from the plurality of predetermined audit checklists stored within the database;
- process an inquiry submitted by the user including a selection of one of the options displayed on the client system and a selected business unit included within the hierarchy of business units;
- provide CA information in response to the inquiry including CA information for the selected business unit including providing the CA tasks and the responsible person assigned to each CA task for the selected business unit;

notify users electronically of CA tasks to be performed at the selected business unit and corresponding CA deadlines;

track the CA tasks to be performed at the selected business unit and the corresponding CA deadlines to ensure compliance;

determine at a selected time active CA tasks, CA tasks completed year to date, total CA tasks year to date, percentage of CA tasks completed year to date, and total CA tasks past due for a plurality of locations assigned to a manager; and provide an electronic report of the CA tasks to be performed and the CA deadlines to the managerial user system, wherein the report displays active CA tasks, CA tasks completed year to date, total CA tasks year to date, percentage of CA tasks completed year to date, and total CA tasks past due for each of the plurality of locations assigned to the manager.

28. A system in accordance with claim 27 wherein the server system is further configured to store CA information within the database based on the hierarchy of business units such that CA information is retrievable and displayable in response to a selected business entity included within the business entity level, or by a selected organization included within the organization level corresponding to the selected business entity, or by a selected site which is included within the site level corresponding to the selected organization, or by a selected department which is included within the department level corresponding to the selected site, or by a selected building that is included within the building level corresponding to the selected department.

29. A system in accordance with claim 27 wherein said server system further comprises a receiving component that receives an inquiry from the client system regarding certain topics including at least one of environment, health and safety, quality, legal, and corporate compliance.

30. A system in accordance with claim 27 wherein said server system further comprises a processing component that cross-references CA information with the CA audit tool to assure compliance with certain laws, rules, regulations, standards, and policies.

31. A system in accordance with claim 27 wherein said server system further comprises a notifying component that notifies users by transmitting an electronic message to the client system from the server system regarding a CA task to be performed within a time period shown on the CA calendar such that compliance with certain laws, rules, regulations, standards, and policies relating to certain topics including at least environment, health and safety, quality, legal, and corporate compliance is assured.

32. A system in accordance with claim 27 wherein said server system further comprises a providing component that provides an electronic report to the managerial user system by transmitting an electronic report to the managerial user system from the server system summarizing the CA tasks performed at a site location for a time period shown on the CA calendar such that managerial oversight of the CA information is facilitated and compliance with certain laws, rules, regulations, standards, and policies relating to certain topics including at least one of environment, health and safety, quality, legal, and corporate compliance is assured.

33. A computer program embodied on a computer readable medium for managing, storing, and disseminating CA information for a business entity, said program comprising a code segment that receives CA information relating to the business entity and then:

maintains a database by adding, deleting and updating CA information;

creates within the database a hierarchy of business units included within the business entity, wherein the hierarchy of business units includes at least the business entity level, an organization level, a site level, a department level and a building level, and wherein the organization level is a predefined sub-portion of the business entity level, the site level is a predefined sub-portion of the organization level, the department level is a predefined sub-portion of the site level, and the building level is another predefined sub-portion of the site level;

stores CA information and a plurality of predetermined audit checklists within the database including organizing the stored CA information based on the hierarchy of business units such that CA information is retrievable and displayable by at least one of the business units included within the hierarchy of business units, wherein the CA information includes a responsible person assigned to each task at each business unit at each level within the hierarchy of business units;

electronically displays on a client system a compliance calendar option, an audit tracking option, and audit tool option, wherein the compliance calendar option causes to be displayed on the client system CA tasks to be performed and corresponding CA deadlines, wherein the audit tracking option prompts the user to input audit information, and wherein the audit tool option prompts the user to select at least one audit checklist from a plurality of predetermined audit checklists stored within the database;

processes an inquiry submitted by the user including a selection of one of the options displayed on the client system and a selected business unit included within the hierarchy of business units;

provides CA information in response to the inquiry including CA information for a selected business unit;

notifies users of CA tasks to be performed at the selected business unit and corresponding CA deadlines including providing the CA tasks and the responsible person assigned to each CA task for the selected business unit;

tracks the CA tasks to be performed at the selected business unit and the corresponding CA deadlines to ensure compliance;

determines at a selected time active CA tasks, CA tasks completed year to date, total CA tasks year to date, percentage of CA tasks completed year to date, and total CA tasks past due for a plurality of locations assigned to a manager; and generates a CA task summary report for the manager responsible for managing compliance for the plurality of locations, wherein for each location being managed by the manager the summary report displays: active CA tasks, CA tasks completed year to date, total CA tasks year to date, percentage of CA tasks completed year to date, and total CA tasks past due.

34. A computer program in accordance with claim 33 further comprising a code segment that provides at least one of:

an option to filter CA calendars based on at least one of site information, CA task type, assigned contact person, and time frame;

an option to filter CA audit tracking system based on at least one of site information, CA task type, assigned contact person, and time frame; and an option to filter CA audit tool system based on at least one of site information, CA task type, assigned contact person, and time frame.

35. A computer program in accordance with claim 33 further comprising a code segment that stores CA information within the database based on the hierarchy of business units such that CA information is retrievable and displayable in response to a selected business entity included within the business entity level, or by a selected organization included within the organization level corresponding to the selected business entity, or by a selected site which is included within the site level corresponding to the selected organization, or by a selected department which is included within the department level corresponding to the selected site, or by a selected building that is included within the building level corresponding to the selected department.

36. A computer program in accordance with claim 33 further comprising:
- a code segment that accesses said database;
- a code segment that searches said database in response to an inquiry;
- a code segment that retrieves information from said database;
- a code segment that causes retrieved information to be displayed on a client system;
- a code segment that notifies a user of CA tasks and CA deadlines; and
- a code segment that causes a report summarizing the CA tasks and the CA deadlines for a site location to be displayed on a managerial user system.

37. A computer program in accordance with claim 33 further comprising a code segment that cross-references said CA calendar when a CA task is performed.

38. A computer program in accordance with claim 33 further comprising a code segment that cross-references said CA calendar to at least one previously created CA calendar when CA information is received.

39. A computer program in accordance with claim 33 further comprising a code segment that cross-references said CA calendar with said CA audit tracking system information.

* * * * *

UNITED STATES PATENT AND TRADEMARK OFFICE
CERTIFICATE OF CORRECTION

PATENT NO. : 7,640,165 B2
APPLICATION NO. : 09/682713
DATED : December 29, 2009
INVENTOR(S) : R. Mukund It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1110 days.

Signed and Sealed this

Twenty-first Day of December, 2010

David J. Kappos
*Director of the United States Patent and Trademark Office*